United States Patent
Rajendran

(10) Patent No.: US 10,674,518 B2
(45) Date of Patent: Jun. 2, 2020

(54) DYNAMIC MANAGEMENT OF INTERFERENCE AND COVERAGE IN WIRELESS COMMUNICATIONS

(71) Applicant: Comcast Cable Communications, LLC, Philadelphia, PA (US)

(72) Inventor: Karupaiah Rajendran, Wayne, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 15/855,494

(22) Filed: Dec. 27, 2017

(65) Prior Publication Data
US 2019/0200363 A1 Jun. 27, 2019

(51) Int. Cl.
| | |
|---|---|
| H04W 72/08 | (2009.01) |
| H04W 52/16 | (2009.01) |
| H04W 52/32 | (2009.01) |
| H04W 72/04 | (2009.01) |
| H04W 52/50 | (2009.01) |
| H04W 52/22 | (2009.01) |
| H04W 52/14 | (2009.01) |

(52) U.S. Cl.
CPC ....... *H04W 72/082* (2013.01); *H04W 52/146* (2013.01); *H04W 52/16* (2013.01); *H04W 52/225* (2013.01); *H04W 52/228* (2013.01); *H04W 52/325* (2013.01); *H04W 52/50* (2013.01); *H04W 72/0413* (2013.01)

(58) Field of Classification Search
CPC ... H04W 52/16; H04W 52/32; H04W 52/325; H04W 52/04; H04W 52/06; H04W 52/08; H04W 52/10; H04W 52/12; H04W 52/14; H04W 52/18; H04W 52/50; H04W 52/125; H04W 52/143; H04W 52/146; H04W 52/225; H04W 52/228; H04W 72/04; H04W 72/0413; H04W 72/048; H04W 72/0486; H04W 72/0493; H04W 72/08; H04W 72/082; H04W 72/1252; H04W 72/1257

See application file for complete search history.

(56) References Cited

U.S. PATENT DOCUMENTS

| | | | |
|---|---|---|---|
| 8,385,832 B2* | 2/2013 | Johansson | H04W 52/343 455/63.1 |
| 8,422,446 B2 | 4/2013 | Yamada | |
| 8,744,513 B2 | 6/2014 | Chen et al. | |
| 8,818,441 B2 | 8/2014 | Haim et al. | |
| 8,964,868 B2 | 2/2015 | Shin et al. | |
| 9,288,743 B2* | 3/2016 | Yang | H04L 5/003 |
| 9,313,743 B2* | 4/2016 | Kwon | H04W 52/146 |
| 9,363,780 B2 | 6/2016 | Yang et al. | |
| 9,386,538 B2* | 7/2016 | Kim | H04W 52/146 |

(Continued)

*Primary Examiner* — Tri H Phan
(74) *Attorney, Agent, or Firm* — Banner & Witcoff, Ltd.

(57) ABSTRACT

Systems, apparatuses, and methods are described for optimizing transmission power levels for wireless communications. Dynamic uplink power control of wireless device transmissions may be controlled. Conditions in a source cell and neighboring cells may be monitored and uplink transmission power levels may be dynamically adjusted based on those conditions. Transmission power levels may be increased or decreased gradually, and conditions of source cell and neighboring cells may be monitored to determine optimized power levels.

20 Claims, 10 Drawing Sheets

(56) References Cited

U.S. PATENT DOCUMENTS

| | | |
|---|---|---|
| 9,398,544 B2 | 7/2016 | Luo et al. |
| 9,585,103 B2 * | 2/2017 | Chen .................... H04W 52/18 |
| 9,706,505 B2 * | 7/2017 | Pietraski ................ H04L 5/001 |
| 10,009,858 B2 * | 6/2018 | Suzuki .................. H04W 52/34 |
| 10,368,322 B2 * | 7/2019 | Dinan ................... H04W 52/54 |
| 2011/0195735 A1 | 8/2011 | Irmer et al. |
| 2012/0176998 A1 | 7/2012 | Muellner et al. |
| 2013/0250875 A1 * | 9/2013 | Chen ................... H04W 52/365 |
| | | 370/329 |
| 2015/0358914 A1 | 12/2015 | Song et al. |
| 2018/0139632 A1 * | 5/2018 | Tarlazzi ................. H04B 17/19 |
| 2018/0139702 A1 * | 5/2018 | Ramkumar ........... H04W 52/16 |

* cited by examiner

DYNAMIC MANAGEMENT OF INTERFERENCE AND COVERAGE IN WIRELESS COMMUNICATIONS

BACKGROUND

Wireless communications may experience problems resulting from non-optimal transmission power levels. For example, a wireless device may experience call connection failures when attempting to connect to a network device, such as a base station, if the transmission power level of the wireless device is not sufficiently above a noise and interference power level in a cell. However, the wireless device may not exceed a maximum transmission power level, and as a result, in some instances it may not be able to increase its transmission power level above the noise and interference power level. While static power level adjustments may be made within a cell, such adjustments may not be optimized for real-time or near real-time conditions in the cell and in its neighboring cells. As a result, static power level adjustments may result in transmission power levels that are either too low (and may cause, e.g., lower throughput) or that are too high (and may cause, e.g., increased interference and faster battery drain).

SUMMARY

The following summary is not intended to limit or constrain the detailed description. The following summary merely presents several described features in a simplified form as a prelude to the more detailed description provided below.

Dynamic management of interference and coverage in wireless communications is described. For example, power values used to determine power levels for physical uplink shared channel (PUSCH) and physical uplink control channel (PUCCH) transmissions, respectively, may be optimized dynamically. These power values may be determined for each cell in a radio cluster based on real-time or near real-time conditions in the source cell and in neighboring cells.

One or more computing devices in a wireless network, such as a cellular network or a Self-Optimized Network ("SON"), may receive data associated with uplink transmissions from one or more other devices, such as a base station, and determine one or more power values upon which uplink transmission power may be based for subsequent uplink transmissions. The data associated with uplink transmissions and the power values may also be communicated from base station to base station, from base station to another device, or from any other device to one or more base stations. New power values may be determined based on an average power value for previous uplink transmissions across a radio cluster. New power values for a source cell also may be determined based on a comparison of the average power value with an existing power value for the source cell. The new power values may be determined further based on a variety of other network conditions, including, e.g., uplink physical resource block utilization rate, call connection success rate, signal to interference and noise ratio, and success rate for uplink scheduling requests. Current power values may also be adjusted to new power values by a predetermined amount (e.g., 1 dBm, 2 dBm, or 3 dBm), and the power values may be further adjusted by that amount based on subsequent uplink performances in a source cell and in neighboring cells. By providing optimized power values, improved performance in wireless communications, such as reduced uplink interference and/or increased uplink cell throughput, may be achieved.

BRIEF DESCRIPTION OF THE DRAWINGS

These and other features of the present disclosure will become better understood with regard to the following description, claims, and drawings. The present disclosure is discussed by way of examples in, and is not limited by, the accompanying figures in which like numerals indicate similar elements.

DETAILED DESCRIPTION

In the following description, reference is made to the accompanying drawings identified above, which form a part hereof, and in which are shown examples of the disclosure. Other examples may be utilized, and structural and functional modifications may be made, without departing from the scope discussed herein. Various features are capable of being practiced or being carried out in various different ways.

Systems, apparatuses, and methods are described for dynamic management of interference and coverage in wireless communications. Dynamic power control may be advantageous for wireless communications, including, for example, dynamic power control for uplink transmissions, although it may also benefit and be applied to any other system or infrastructure (e.g., downlink transmissions and other wireless or wired communications). Dynamic uplink power control may include dynamically adjusting power parameters, such as nominal power values, $P_{0\_PUSCH}$ and $P_{0\_PUCCH}$, used for determining power levels for physical uplink shared control channel (PUSCH) and physical uplink control channel (PUCCH) transmissions, respectively. Dynamic uplink power control may be based on uplink transmissions in a source cell as well as uplink transmissions in neighboring cells. A source network device, such as a base station, may communicate information regarding uplink transmissions via the source cell with neighboring cells, e.g., via communications with neighboring network devices such as neighboring base stations. Network devices may also communicate information regarding uplink transmissions with other types of devices in a network (e.g., servers, gateways, access points, portals, and databases). Dynamic adjustment of an uplink power parameter may, e.g., increase bandwidth, increase throughput, and provide overall improved communications within a cell as well as across a network.

Figure 1A:
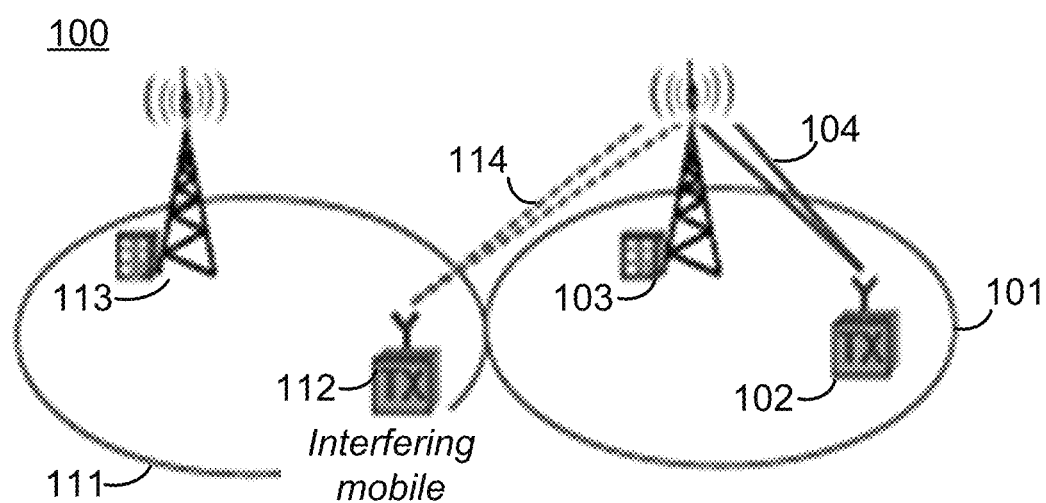
FIG. 1A shows an example of a network.

FIG. 1A shows an example of a network 100. The network 100 may be a wireless network such as a cellular network. The network 100 may comprise a plurality of cells, e.g., a first cell 101 and a second cell 111. One or more of a plurality of wireless devices 102 may be located within a cell 101 and communicate in the network 100. The wireless devices 102 may include user equipment ("UE"), and may be a cellular telephone, smartphone, wireless enabled laptop, and/or any other suitable wireless device. The wireless devices 102 may communicate with one or more network devices 103, such as a base station and/or or any other transmitting/receiving entity. The base station may be, for example, an evolved Node B ("eNB"). The communications links 104 may accommodate communications via an uplink carrier (e.g., from a wireless device 102 to a network device 103) and via a downlink carrier (e.g., from a network device 103 to a wireless device 102). A plurality of channels for these communications are described below with respect to FIG. 1B. As an example, the wireless device 102 may communicate, via a wireless communications link 104, with a first network device 103, located in a first cell 101. In addition, one or more of a plurality of the wireless devices 112 may be located within a second cell 111 while attempting to communicate, via a wireless communications link 114, with the first network device 103 in the first cell 101, notwithstanding the potential presence of a second wireless device 113 located within the second cell 111. In such a scenario, the second wireless device 112 may become an interfering wireless device. For example, the wireless device 112 may interfere with communications between the first wireless device 102 and the first network device 103, causing issues such as noise and call connection failures for the first wireless devices 102 or other wireless devices located in the first cell 101, or for other wireless devices located in other neighboring cells (not shown) that may likewise be prone to cause similar interference with communications via the wireless communications link 104. The above described type of interference may be generally referred to as inter-cell interference.

Wireless devices may transmit power headroom ("PHR") reports to network devices to assist with dynamic power control, as follows. Power headroom may be referred to as a measure of the difference between a maximum allowable transmit power and the transmit power that would have been used assuming that there would have been no upper limit on the transmit power. The power headroom may be zero, or it may be a negative or positive value. Uplink transmission power may be determined based on PHR reports in real-time or near real-time. For example, to assist a scheduler in a selection of a combination of modulation and coding scheme (MCS) and resource size that does not lead to a wireless device being power limited, a wireless device may be configured to provide regular power headroom reports on its power usage. A PHR report may be generated and transmitted by a wireless device 102 in a cell 101 to a network device 103 for that cell indicating that the noise floor has increased. The network device 103 may also receive PHR reports from other wireless devices in the cell, each providing an indication of whether the noise floor has increased. Collectively, these PHR reports may be analyzed in real-time or near real-time to inform the network device 103 whether call connection failures are isolated to a particular wireless device or group of wireless devices, or whether call connection failures are more widespread across the cell, e.g., such that the noise floor may have increased above maximum allowable transmission power of the wireless devices. The network device 103 may also transmit PHR reports or information relating to the PHR reports to a neighboring network device 113 located in a neighboring cell 111 or with any other one or more devices, including, e.g., with any device in network 300 described below regarding FIG. 3A. Any device that receives PHR reports or information relating to PHR reports may perform the above analysis. By analyzing PHR reports, devices may be more informed about uplink transmission power of devices throughout a network 100.

In at least some examples, the network 100 may comprise, e.g., a Long Term Evolution ("LTE") network, a LTE-Advanced network, a 5G network, or other communications systems, such as communication systems according to one or more wireless communications standards specified by the $3^{rd}$ Generation Partnership ("3GPP"), including but not limited to Releases 10, 11, 12, 13, 14, 15, or earlier or later releases. LTE and networks that are backward compatible with LTE or portions thereof may be designed in a way such that there may be limited or no intracellular interference, and thus, the above-described inter-cell interference may be a primary source of interference within the network 100. Power control and power configuration may reduce this inter-cell interference as well as reduce power consumption. In addition, power control and power configuration may improve battery life of wireless devices and may result in greater cell capacity and improved control of the maximum data rate for wireless devices, throughout a cell and especially at an edge of a cell.

Figure 1B:
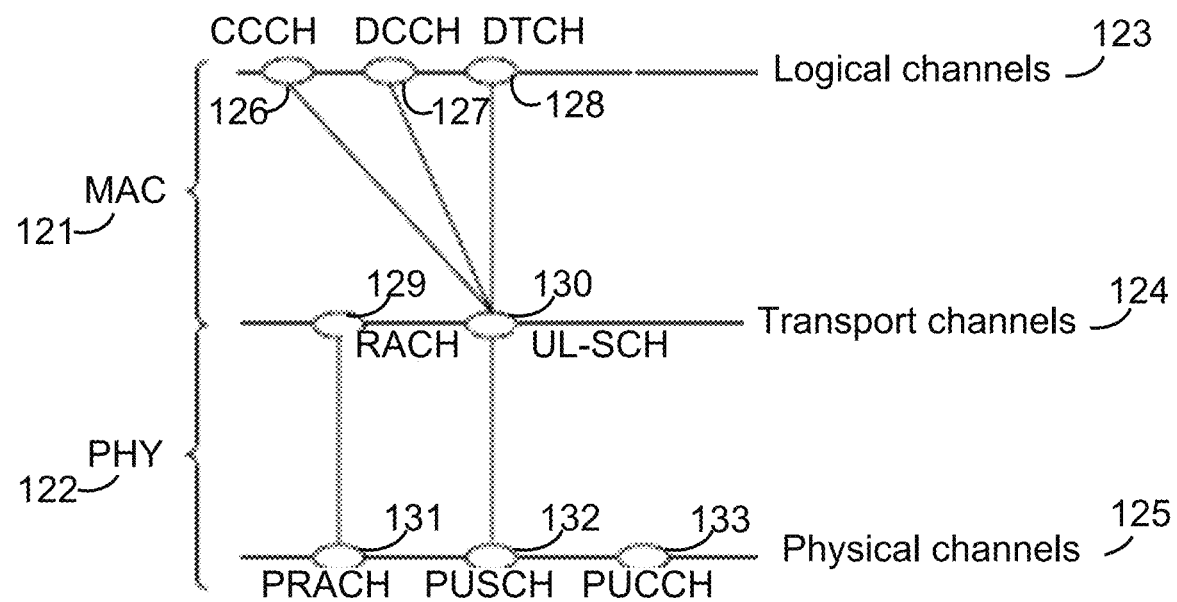
FIG. 1B is a diagram showing examples of channels for communications.

FIG. 1B shows channels in a media access control layer ("MAC") 121 and a physical layer ("PHY") 122, for communications in a network such as network 100 described above regarding FIG. 1A. Channels may comprise logical channels 123, transport channels 124, and physical channels 125. Downlink logical channels 123 may comprise, for example, a common control channel ("CCCH") 126, a dedicated control channel ("DCCH") 127, and a dedicated traffic channel ("DTCH") 128. For the downlink, the CCCH 126 and the DCCH 127 may be used to carry control information from the network 100 to a wireless device (e.g., wireless device 102). The CCCH 126 may be used for wireless devices having no radio resource control ("RRC") connection, whereas the DCCH 127 may be used for wireless devices having an RRC connection. The DTCH 128 may be a point-to-point channel dedicated to a single wireless device for transmission of user information. All three uplink logical channels 123 may be mapped to a transport channel, such as an uplink shared channel ("UL-SCH") 130.

Transport channels 124 may comprise a random access channel ("RACH") 129 and the UL-SCH 130. The RACH 129 may be used for transmission of limited control information from a wireless device having transmissions that may collide with transmissions from other wireless devices. The RACH 129 may be mapped to a physical random access channel ("PRACH") 131. The UL-SCH 130 may support adaptive modulation and coding, hybrid automatic repeat requests ("HARQ"), power control, semi-static resource allocation, and/or dynamic resource allocation. The UL-SCH 130 may be mapped to a physical uplink shared channel ("PUSCH") 132.

Physical channels 125 may comprise the PRACH 131, the PUSCH 132, and a physical uplink control channel ("PUCCH") 133. The PUCCH 133 may be a stand-alone uplink physical channel that may be used to carry downlink channel quality indication ("CQI") reports, scheduling requests ("SR"), and HARQ acknowledgements ("ACK") and negative acknowledgements ("NACK") for downlink transmissions. Link adaptation may be used to select the transport format to ensure that quality of service requirements are enforced while using resources efficiently and to maximize user throughput over the air interface. Channel prediction may also be used to provide information for determining functions, such as changing power and the modulation and coding scheme, based on wireless device measurements. Data rates for transmissions on the channels described above regarding FIG. 1B may depend on scheduling physical resource blocks, described further herein.

Figure 2:
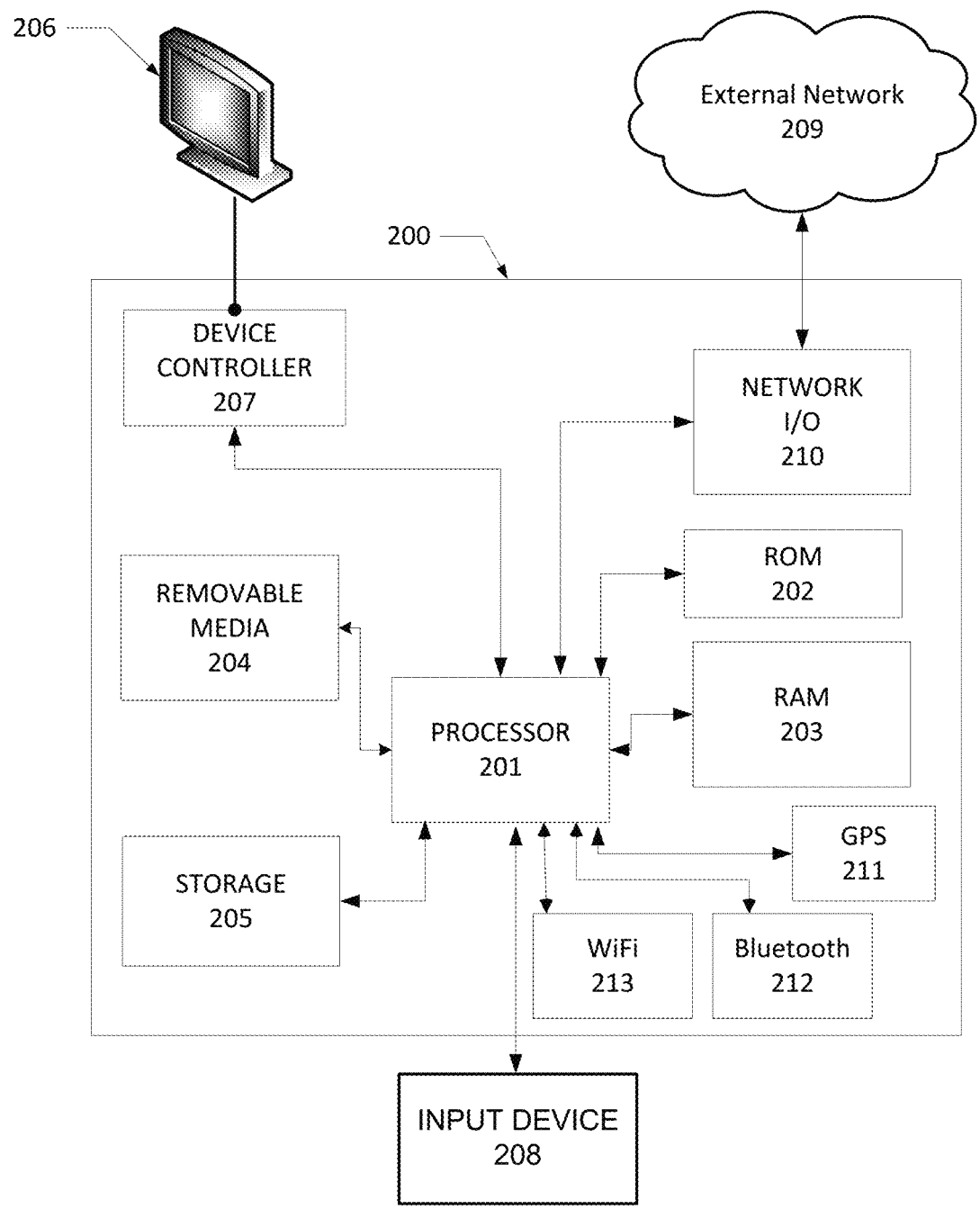
FIG. 2 shows an example device that may be used to implement any of the systems, methods, or apparatuses described herein.

FIG. 2 shows general hardware elements that may be used to implement any of the various devices discussed herein, including e.g., a wireless device, a network device, or any computing device as described further below. A device 200 may include one or more processors 201, which may execute instructions of a computer program to perform any process or step described herein. The instructions may be stored in any type of computer-readable medium or memory to configure the operation of the processor 201. For example, the computer-readable medium and/or memory may be configured to store instructions, that when executed, cause the device 200 to perform steps such as described herein regarding any of FIGS. 1A, 1B, 3A, 3B, 4, 5A, 5B, 6A, and 6B. Instructions may be stored in one or more of a Read-Only Memory (ROM) 202, a Random Access Memory (RAM) 203, a removable media 204, a Universal Serial Bus (USB) drive, a Compact Disk (CD) or a Digital Versatile Disk (DVD), a hard drive, and/or any other desired electronic storage medium. A removable media 204 may comprise, e.g., a memory card, such as a Micro Secure Digital (MicroSD) card, including, e.g., Secure Digital High Capacity (SDHC), Secure Digital Extended Capacity (SDXC), or any other type of removable storage. Instructions may also be stored in an attached (or internal) storage 205, such as an internal or external hard drive.

The device 200 may include one or more output devices, such as a display 206 (e.g., an integrated or external display, monitor, and/or television), and may include a device controller 207, such as a video processor. The device 200 may include an input device 208, such as one or more of a remote control, a keyboard, a mouse, a touch screen, a microphone, a motion sensing input device, and/or any other input device.

The device 200 may also include one or more network interfaces, such as a network Input/Output (I/O) interface 210 to communicate with a network 209. The network interface 210 may be a wired interface, a wireless interface, or a combination of wireless and wireless interfaces. The network 209 may include one or more external networks 109, a cellular network, a local area network, a wide area network, and/or any other desired network. Additionally, the device may include a location-detecting device, such as a global positioning system (GPS) microprocessor 211, which may be configured to receive and process global positioning signals and determine, with possible assistance from an external server and antenna, a geographic position of the device 200. The device 200 may also include a Bluetooth enabled transceiver 212 and/or a Wi-Fi access point 213.

Determining an appropriate transmission power for uplink transmissions may help to provide successful communications. For example, receiving uplink transmissions with sufficient power by a network device 103 may allow for proper demodulation of the signal in order to determine the information that was transmitted. If an uplink transmission power is too low, proper demodulation may not be possible. However, if an uplink transmission power is too high, the transmission could cause interference to other calls in a network. The uplink power control for the shared channel may be configured so that the target received power spectral density ("PSD") at the network device 103 is constant, regardless of where a wireless device 102 is located within a cell 101. This may be done by a wireless device 102 estimating a pathloss ("PL") and fully compensating the output power with that PL estimation. The target received PSD at the network device 103 may be determined by a configurable parameter, $P_0$, (e.g., $P_{0\_PUSCH}$, $P_{0\_PUCCH}$), discussed further below. The transmit power may depend on channel properties, such as the channel attenuation and the noise and interference level at the receiver side. As a result, power control and rate control may be interrelated.

Uplink power control may be based on formulas provided by 3GPP, such as in 3GPP TS 36.213 v14.2.0 (2017-03). For example, power control for PUSCH transmissions and PUCCH transmissions may be described by the following expressions:

$$P_{PUSCH} = \min\{P_{CMAX}, P_{0\_NOMINAL\_PUSCH} + \alpha + PL_{DL} + 10\log_{10}(M) + \Delta MCS\} \quad \text{(Eq. 1)}$$

$$P_{PUCCH} = \min\{P_{CMAX}, P_{0\_NOMINAL\_PUCCH} + PL_{DL} + g\} \quad \text{(Eq. 2)}$$

In the above expressions (Eq. 1 and Eq. 2), "$P_{CMAX}$" is a maximum allowable transmission power for a wireless device serving cell. "a" is a value smaller than or equal to 1 that allows for partial pathloss compensation and may be set to 1 for the open loop to compensate completely for the pathloss. "$PL_{DL}$" is the downlink pathloss estimate for the wireless device serving cell. "M" indicates the instantaneous PUSCH bandwidth measured in number of resource blocks, and "$10\log_{10}(M)$" is a factor that reflects that parameter $P_{0\_NOMINAL\_PUSCH}$ (referred to herein as the "$P_{0\_PUSCH}$ value") may correspond to a power per resource block value. "g" is the current PUCCH power control adjustment state. For a larger resource assignment, a correspondingly higher received power, and in turn, a higher transmit power, may be required. A larger resource assignment may occur, for example, with a higher number of resource blocks for the scheduled subframe. A correspondingly higher received power may occur, for example, with a higher resource block assigned to the participating wireless device 102, such that the total power received by the network device 103 from the intended wireless device 102 may be high in comparison to the smaller resource block assignments, as power per resource block may be kept the same. A higher transmit power may occur, for example, with total transmit power per subframe increasing proportionally to a resource block increase. "$\Delta MCS$," or change in modulation and coding scheme, reflects the fact that different signal-to-interference-plus-noise ratio (SINR) may be required for different modulation schemes and coding rates used for the PUSCH transmission.

$P_{0\_PUSCH}$ and $P_{0\_PUCCH}$ values in a cell that are not optimized may lead to undesirable conditions. For example, if a $P_{0\_PUSCH}$ value is set too low, lower UL throughput may result for users close to the site (e.g., within an otherwise acceptable coverage area), and a smaller cell range may result if the overall noise floor is higher than a nominal value (e.g., if the UL received signal strength indicator ("RSSI") is close to the $P_{0\_PUSCH}$ value). In addition, if a $P_{0\_PUSCH}$ value is set too high, high UL interference may result and cause reduction in the cell user capacity, degradation of UL cell and user throughput may result (e.g., for wireless devices in poor SINR areas), and undesirable wireless device battery drain may occur due to a wireless device transmitting with an increased UL transmission power (e.g., if there is an increase in the noise floor). As another example, if $P_{0\_PUSCH}$ and $P_{0\_PUCCH}$ values are not optimized, poor performance of centrally located wireless devices may result due to a corresponding non-optimal modulation and coding scheme. Systems, apparatuses, and methods are described for optimizing $P_{0\_PUSCH}$ and $P_{0\_PUCCH}$ values.

Across a network, such as network 100, radio network parameter values may be set to be the same in each cell. These radio network parameter values may need to account for a variety of variables, e.g., different types of traffic, subscriber densities, over subscription ratios (e.g., to meet peak calling traffic requirements), radio coverage confidence, and minimum uplink throughput. Radio network parameter values that are selected may be referred to as "gold standard," or recommended values, that are based on the baseline network design. These recommended values may become static once a cell is in service. However, these values may be changed by Radio Optimization Engineers ("ROE") in a manual process of analyzing the performance of a cell, e.g., if the cell may not be meeting bench marked cell level key performance indicator ("KPI") values.

Among the radio network parameters, the selection of $P_0$ values, (e.g., $P_{0\_PUSCH}$, $P_{0\_PUCCH}$), may have a significant impact on KPIs, such as throughput and uplink capacity. Setting these $P_0$ values statically across all cells in a network may be appropriate in some circumstances, such as if inter site distance ("ISD") is maintained across all network devices in the network, the radio coverages overlap, and user distribution is uniform. However, in many circumstances, these conditions are not present. For example, variables such as terrain and subscriber density may render the above circumstances unachievable. Maintaining ISD across all network devices and radio coverage overlap in a network also may be challenging. Accordingly, in examples described herein, $P_0$ values may be determined and set dynamically throughout a network to improve or maintain KPIs at acceptable levels across the network. For example, dynamic $P_0$ values may be determined based on factors such as number of receive antennas, $P_0$ values of neighboring cells, total number of neighboring cells, total number of intra frequency neighboring cells, uplink interference of an intended cell (e.g., in physical resource block ("PRB") resolution) and its neighbors, accumulated interference power of a first PRB (e.g., PRB(0)) to a last PRB (e.g., PRB(99)), uplink throughput, current connected user uplink power, instantaneous load, uplink power headroom or power restriction statistics, uplink modulation and coding scheme allocation statistics and wireless device distribution, uplink SINR distribution of a cell and its neighbors, and uplink RSSI. The above or other factors may be measured over a defined period of time, such as a number of minutes (e.g., 1, 5, 10, 15, 30, or 45 minutes), hours (e.g., 1, 3, 5, 6, 10, 12, or 18 hours), or days (e.g., 1, 3, 5, 7, 10, or 14 days) or any other interval. Wireless device uplink transmission power may be controlled on a physical resource block ("PRB") level based on coordination among network devices. Additionally or alternatively, a Self-Optimized Network ("SON") device or another device may optimize $P_{0\_PUSCH}$ and/or $P_{0\_PUCCH}$ values based on, e.g., the above factors, to reduce uplink interference and increase average uplink cell throughput.

A network device 103 may transmit $P_{0\_PUCCH}$ and $P_{0\_PUSCH}$ values in a network to wireless devices in a cell (e.g., wireless device 102 in cell 101). The same network device 103 may also transmit the same or different $P_{0\_PUCCH}$ and $P_{0\_PUSCH}$ values to other network devices or wireless devices in one or more neighboring cells (e.g., network device 113 or wireless device 112 in cell 111). A network device may broadcast $P_{0\_PUSCH}$ and $P_{0\_PUCCH}$ values to wireless devices in a cell as part of an initial configuration signaling. For example, if a wireless device enters an area of a cell, the network device for that cell may broadcast $P_{0\_PUSCH}$ and $P_{0\_PUCCH}$ values to the wireless device using System Information Block type 2 ("SIB-2") signaling. The $P_{0\_PUSCH}$ value specifies the nominal component of a wireless device transmission power for PUSCH, and the $P_{0\_PUCCH}$ value specifies a nominal component of a wireless device transmission power for PUCCH. The $P_{0\_PUCCH}$ value may comprise a 5-bit cell specific parameter provided by higher layers, and may have 1 dBm resolution in a range, e.g., of [−127, −96] dBm. The $P_{0\_PUSCH}$ value may comprise an 8-bit cell specific parameter provided by higher layers, and may have 1 dBm resolution in a range, e.g., of [−126, 24] dBm. $P_{0\_PUSCH}$ and $P_{0\_PUCCH}$ values may be determined based on a variety of measurements that may balance user capacity and peak throughput. For example, the $P_{0\_PUSCH}$ and $P_{0\_PUCCH}$ values may be determined so as to allow uplink transmission to be received with sufficient power for proper demodulation of the corresponding information being sent. And, for example, the $P_{0\_PUSCH}$ and $P_{0\_PUCCH}$ values may be determined such that the transmit power may not be unnecessarily high, so as to avoid causing unnecessary interference to other cells. For example, $P_{0\_PUSCH}$ and $P_{0\_PUCCH}$ values may depend upon UL noise rise, UL interference, wireless device power restrictions, sector/service area throughput, and UL coverage limitations. As an example, a peak $P_{0\_PUSCH}$ value threshold may be equal to a noise level plus an UL SINR requirement. The UL SINR requirement may be, e.g., 15 dBm to 18 dBm for a modulation and coding scheme of 16-level Quadrature Amplitude Modulation (16-QAM) having a ¾ coding rate. The UL SINR requirement may also vary depending on a vendor or user threshold (e.g., +/−1, 2, or 3 dBm). A noise level may be determined from the following equation:

$$\text{Noise level} = -174 \text{ dBm/Hz} + X \text{ dBm } (NF) + 10 \log_{10}(PRB\ BW \text{ in Hz}) \quad \text{(Eq. 3)}$$

Noise level above is in units of dBm. "NF" refers to a Noise Figure, and "PRB BW in Hz" refers to bandwidth, in Hertz, of physical resource blocks. "X" refers to an adjustment value for the Noise Figure, and may have a value, e.g., from 3 dB to 20 dB, based on the noise influenced by nearby transmitters and/or external noise.

Dynamic uplink power control may prevent an undesirable "sleeping" cell condition, described below. A noise floor at both a transmitter and receiver may be determined and used for setting power levels. During uplink transmissions, the noise floor of the uplink transmission for the wireless device may be based on the noise floor of the network device receiving the uplink transmissions. If noise floors at communicating devices are matched, minimum transmission power may be used for successful transmissions. For example, if a wireless device is used to set a target value, and a user of the wireless device first speaks (e.g., "hello"), the maximum tone may be set based on that initial speech. But if the background noise is too high and cancels out the speech, the speech may not reach the network device. Background noise may increase or decrease at any time (e.g., if a person enters or leaves a noisy room, a train passes by, a car horn honks, or a person opens or closes a door). Periodically resetting the maximum tone above the noise may account for such changing noise conditions.

If a $P_{0\_PUSCH}$ or $P_{0\_PUCCH}$ value is set to a certain value, such as −108 dBm, and the noise floor is also same value (e.g., due to neighboring cells), a "sleeping" cell may result. In such a scenario, if a wireless device transmits using the same power level as the noise floor, the transmission may be unlikely to reach the network device. The same may be true of transmissions by other wireless devices in the cell that use the same power level as the noise floor. As a result, it may appear that the cell is effectively "sleeping" because wireless device transmissions do not reach the network device. To correct a sleeping cell scenario, it may be impractical for engineers to manually change parameters at each instance of a sleeping cell condition, for example, if the noise floor has significantly increased (e.g., more than 1, 2, 3, or 4 dBm, or other value) over a short duration of time (e.g., minutes, hours, or days, or other period). With dynamic uplink power control, however, sleeping cells may be avoided. For example, if the noise floor increases beyond a threshold, the $P_{0\_PUSCH}$ and/or $P_{0\_PUCCH}$ values may be dynamically adjusted.

The uplink may be fine-tuned, in the manner described above, using ACK and NACK signals. For example, HARQ Indication (HI), which may comprise an indication of a success of uplink packets received, may be mapped on the Physical HARQ Indicator Channel (PHICH). A packet may be transmitted from the network device, and the wireless device may decode it and provide feedback via the PUCCH. With respect to negative acknowledgement (NACK), the network device may send a retransmission. By monitoring a NACK rate increase and/or decrease, and by correlating it with missing responses (e.g., due to an increased Noise Floor, a wireless device going out of a service area, and/or unacknowledged transmissions via PUCCH), the $P_{0\_PUCCH}$ value may be fine-tuned. As an example, by correlating a missing response (e.g., ACK and/or NACK), which may be interpreted as NACK via PUCCH, with the NACK via PHICH (e.g., for the uplink un-received packets) and RACH attempts for the RRC Connected wireless devices, the $P_{0\_PUSCH}$ and/or $P_{0\_PUCCH}$ values may be fine-tuned. Such dynamic feedback may improve uplink capacity as well as throughput for both downlink and uplink transmissions.

Uplink power control may comprise a combination of an open-loop mechanism and a closed-loop mechanism. In open-loop power control, a transmission power may depend on estimates of a downlink pathloss. In closed-loop power control, a transmission power may be adjusted using explicit power-control commands transmitted on the downlink. These power-control commands may be determined based on prior network measurements of received uplink power. Decoding performance may be determined by the received signal-to-interference-plus-noise ratio. Thus, determining an appropriate received power may depend on the interference level on a receiver side. However, the interference level may differ among various deployments, as well as vary over time, e.g., as the load of the network varies.

Open loop may be described further as follows. In uplink power control that is static in nature, a decision may be made for the uplink target received power level at the network device. Power parameters of cells may be preset across a network. For example, an engineer may set a value for $P_{0\_PUSCH}$ and/or $P_{0\_PUCCH}$ at the network device, based on previously determined network conditions such as the noise and interference from neighboring cells. The $P_{0\_PUSCH}$ and/or $P_{0\_PUCCH}$ value may be changed by an engineer periodically, but it may not be changed very often (e.g., in some instances it may not be changed more than daily, weekly, bi-weekly, or monthly). For example, if there is a new deployment, an engineer may identify certain values, e.g., −105 or −103 dBm for PUSCH and −102 or −104 dBm for PUCCH. A capacity may increase over a period of time, and if an engineer sees the noise floor increase as a result of the capacity increasing in all of the cells, the engineer may retune the power value to a new "gold standard" value based on noise floor increase if the subscriber base increases.

Static returning of power values may be challenging and inefficient. For example, interference from neighboring cells may occur at any time. A cell may suddenly experience numerous dropped calls or connection problems if the noise floor increases due to interference caused by neighboring cells. A user may experience this scenario, e.g., if a call is dropped or if a handset displays an indication that a call is "connecting" after a user dials a number and hits "send," followed by a delay prior to the handset ultimately connecting or indicating that the call attempt failed. During such a rise in the noise floor, the wireless device may increase its transmission power in an attempt to communicate with a cell, but so too may other wireless devices within the cell or in neighboring cells. In many instances, a network device and wireless devices in the cell may not be able to identify the source of the inter-cell interference. While an engineer may subsequently review logs that may help to identify likely interference from neighboring cells, and to determine new $P_{0\_PUSCH}$ and/or $P_{0\_PUCCH}$ values for the cell to minimize reoccurrence of similar network conditions, such adjustments in power values may be cumbersome and may not be able to account for changing network conditions in real time or near-real time.

One or more Key Performance Indicators ("KPIs") may be monitored to determine if an adjustment to a power value may be advisable. If cell level KPI values decrease, such as in the scenario described above when dropped calls or connection failures occur, several performance or optimization engineers at different cell sites may review logs to determination possible sources for performance degradation in a respective cell. KPIs may include, e.g., ACK/NACK Success/Failure Rate via PUCCH; NACK/ACK Success/Failure Rate via PHICH; UL RSSI Peak/Average/Minimum PRB Wise and Cell/Carrier Level; Accessibility KPIs such as RACH Success Rate, Initial ERAB Success Rate, and RRC Success Rate; Retain ability KPIs such as abnormal ERAB Release Rate and wireless device Context Abnormal Release Rate; RLC UL BLER; Uplink Radio Congestion; and/or any other measures of performance. For example, while reviewing logs, engineers may look for alarms and any other system changes. If there is an alarm, a source that caused the alarm may be identified and remedied. If there are no alarms, then engineers may perform a parameter optimization in an attempt to identify one or more causes of a KPI decrease.

Some of the parameters that may be optimized are related to power. Parameters for uplink power control may include $P_{0\_PUSCH}$ and $P_{0\_PUCCH}$ values, which generally may be fixed in the described static environment. In a static environment, $P_{0\_PUSCH}$ and $P_{0\_PUCCH}$ values may not be changed until an engineer manually determines new values that are subsequently broadcasted in a similar manner. As an example, a first wireless device in a first cell may receive $P_{0\_PUSCH}$ and $P_{0\_PUCCH}$ values from a SIB-2 broadcast, and use a power level according to those values for its uplink transmissions. If the first wireless device is in an idle mode and the user of the first wireless device attempts to connect to make a call to another user (e.g., a user of a second wireless device), the first wireless device may enter an active state and increase its power level to make the connection.

The first wireless device may be able to access more than one cell. Some cells may be closer to the wireless device than others, and the wireless device must adjust its power level according to which cell it will use for a connection to the second wireless device. The wireless device may receive $P_{0\_PUSCH}$ and $P_{0\_PUCCH}$ values from a network device of a cell, calculate a pathloss to add to an initial target receive power to the network device, and from these values and the pathloss, determine a minimum transmission power for communicating with the network device that is expected to be above the noise floor. With network changes, such as increasing or decreasing capacity resulting from communications in neighboring cells, the noise floor may change. If the noise floor changes, the previously received $P_{0\_PUCCH}$ and $P_{0\_PUSCH}$ values may no longer provide an accurate indication of a power level for uplink transmissions that are both sufficiently above the noise floor (e.g., if the noise floor increases) and power-efficient relative to the noise floor (e.g., if the noise floor decreases).

While engineers may manually evaluate logs for a presence of interference as described above, the information that may be gathered from such evaluation also may be limited. For example, engineers may see performance characteristics of a particular cell site as well as neighboring cell sites but may be unable to identify the source of an interference problem. Interference could be identified for a prior time period, e.g., one week prior, during a specific 10-minute time interval, or other time period, if a large number of calls were dropped (e.g., more than 2%, 5%, or 10% of calls) or few or no users successfully connected. Engineers may perform a trace, e.g., using software, to identify each of the connection failures, including dropped calls and failed connections, at a network device during the identified period of time for one cell, as well as the allocation of resources in that cell. For example, a first cell may have one-hundred resource blocks with only ten of them allocated, whereas a second cell neighboring the first cell may have all of its one-hundred resource blocks allocated at the second cell's frequency. For each cell, the power level in unused resource blocks may be determined, and the noise floor may be determined relative to the $P_{0\_PUCCH}$ and $P_{0\_PUSCH}$ values that have been set for the cell. Engineers may perform similar traces in other cells, during the same time period. By comparing logs and traces of a plurality of neighboring cells with similar logs during other periods of time if connection failures were not as frequent, engineers may narrow down and possibly determine which neighboring cell or cells likely caused the interference that may have led to the dropped calls or failed connections. Without going through analysis such as the above, however, engineers may not be able to determine one or more sources of interference.

Uplink power control may be adapted from a static environment requiring engineering analysis described above to dynamic control that may be performed automatically without requiring the above engineering steps. Power control may be incorporated in open loop and closed loop uplink power control, such as in LTE environments. For example, an open loop power control may set an initial wireless device uplink transmit power that may be refined by a closed loop power control, such as over a physical downlink control channel ("PDCCH") using a maximum power control signal. A cell may obtain a power headroom report through the uplink shared channel. For example, the physical downlink shared channel ("PDSCH") may be used to send power control commands to the wireless device. Based on those commands, the wireless device may adjust its power in the manner described herein and transmit a power headroom report in the uplink. From the power headroom report, a cell may determine $P_{0\_PUSCH}$ and $P_{0\_PUCCH}$ values as described herein. Closed loop power control may proceed if the open loop power control has completed, during downlink power control processes at the network device.

In some scenarios, e.g., if a cell experiences a low interference level if a user of a wireless device in the cell attempts to make a call, closed loop power control may be sufficient. For example, if a wireless device is connected to a cell and has a $P_{0\_PUCCH}$ value set for uplink transmissions at a power level of −108 dBm, and the noise floor is sufficiently lower than that level (e.g., −112 to −114 dBm or lower), then the network device may receive transmissions from the wireless device. In this example, the signal to noise ratio ("SNR") may be sufficient for the network device, such that transmissions between the wireless device and the network device via the RACH may be successful. Even as the cell may begin to experience a higher or lower interference level, closed-loop power control may continue by using a power control command to adjust the power lever of the wireless device uplink transmission in response to a changing interference level.

The $P_{0\_PUSCH}$ and $P_{0\_PUCCH}$ value may be tuned dynamically based on the traffic load at or near the time of tuning. Using dynamic uplink power control, cell capacity may remain at or near a maximum, considering the power level, traffic, interference margin, as well as the possibility of a lightly loaded network. Another advantage with dynamic uplink power control may be an ability to reduce buffer requirements. By maintaining ideal power levels across a network, excess buffers ordinarily used to compensate for decreases in KPI values may be reduced. Faster network correction may also be an advantage with dynamic power control. For example, with static power control, engineers may put out a trace if call connection failures are detected, as described above. However, in order to effectively identify one or more causes of the call connection failures, the same or similar network conditions that caused the call connection failures may need to be present at the time of the trace (e.g., hours, days, or a week after the failures). If the same or similar conditions do not exist at the time of the trace, the engineer may need to wait until the same or similar conditions return and thereafter perform an analysis. Once those conditions are present, analysis may be performed, and an adjustment may be made, but conditions may need to remain the same or similar during subsequent testing to determining whether the adjustment sufficiently addressed the cause or causes of call connection failures. Dynamic power control described herein may be determined much faster and with greater accuracy, as described further below.

Dynamic uplink power control may include tuning power parameters, e.g., $P_{0\_PUSCH}$ and/or $P_{0\_PUCCH}$, such as described in the following example. Dynamic adjustment of an uplink power parameter may help to avoid sleeping cells, and thereby may increase bandwidth and improve throughput.

Figure 3A:
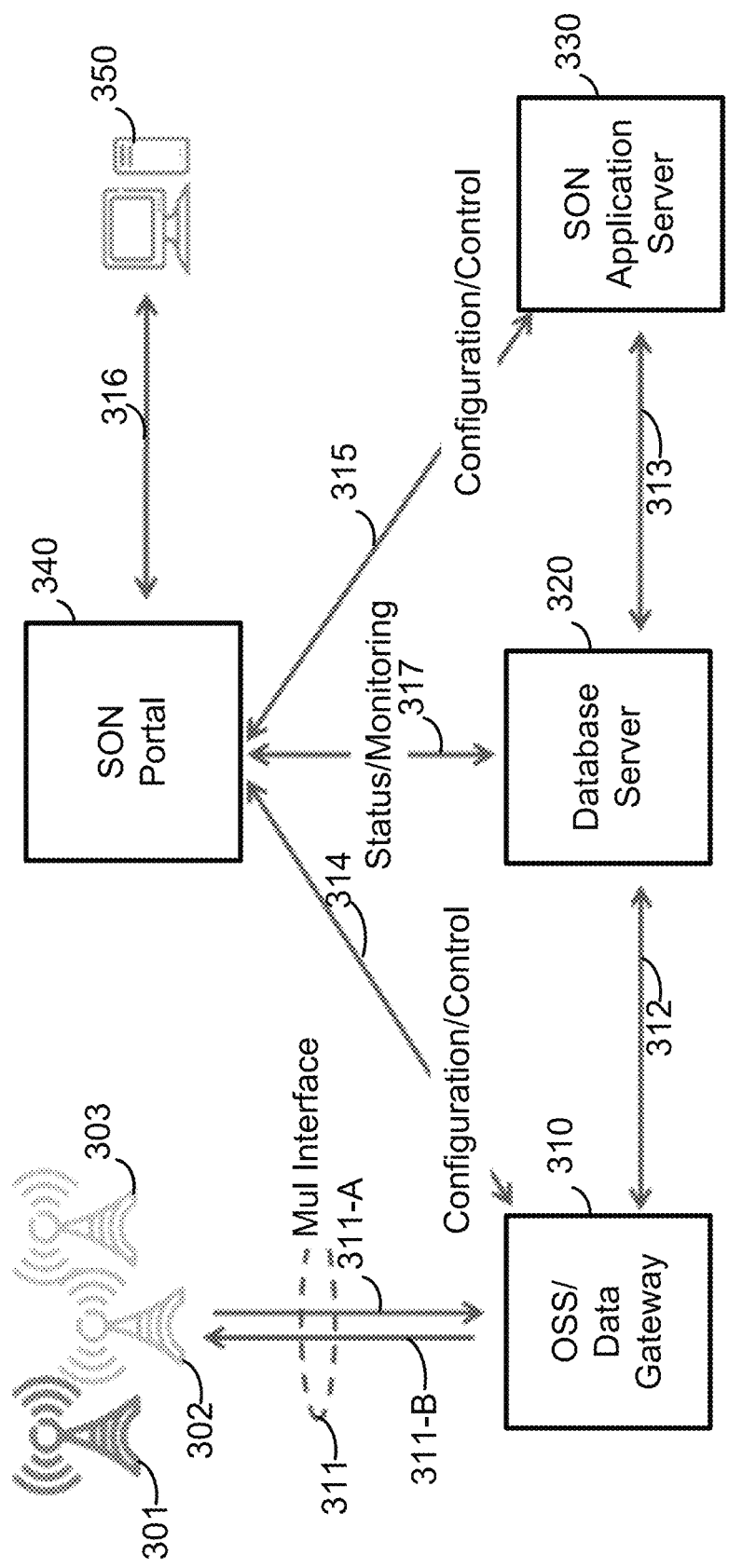
FIG. 3A is a block diagram showing an example system.

FIG. 3A is a high-level diagram showing an example system 300 for dynamic power control. Any of the network devices 301-303 may correspond to the network device 103 or the network device 113 described above with respect to FIG. 1A. For example, the network devices 301-303 may communicate with the wireless devices, such as the wireless device 102 and/or the wireless device 112, in cells of a network, such as the cells 101 and/or 111. As shown in FIG. 3A, each network device 301-303 may also communicate with an Operating Support System ("OSS") and/or a data gateway 310 via a link 311 (e.g., via an uplink carrier 311-A and via a downlink carrier 311-B), which may include, e.g., a MUL, an S1, or an X2 interface. A database server 320 and a Self-Optimized Network ("SON") portal 340 may transmit and receive communications to and from each other, via a link 317, as well as to and from the OSS/data gateway 310 (e.g., via the links 312 and 314, respectively) and to and from a SON application server 330 (e.g., via the links 313 and 315, respectively). The SON portal 340 may also communicate with another system or a device 350 that may be local or remote from the SON portal 340. For example, the SON portal 340 may transmit to and receive from another system or a device 350 configuration, control information, and other information (e.g., KPI values, or $P_{0\_PUCCH}$ and $P_{0\_PUSCH}$ values) for a network 100.

As an example, a network device 301-303 may transmit a configuration management ("CM"), performance management ("PM"), and/or fault management ("FM") trace to the OSS/data gateway 310 via the link 311 (e.g., the uplink 311-A). CM traces may provide configuration information about one or more network devices and cells, PM traces may provide performance information about one or more network devices and cells, and FM traces may provide fault information such as if a network device or a link is down or is otherwise experiencing problems with sending or receiving communications. The OSS/data gateway 310 may mediate the trace and transmit a mediated trace to the database server 320 via the link 312. The OSS/data gateway 310 may also transmit and/or receive configuration and control information to/from the SON portal 340 via the link 314. For example, in response to receiving CM, PM, and/or FM traces from a network device 301-303, the OSS/data gateway 310 may transmit configuration and control information to the SON portal 340, and the SON portal 340 may use the received configuration and control information to determine a change in a $P_{0\_PUSCH}$ value and/or a $P_{0\_PUSCH}$ value.

The database server 320 may process mediated traces received from the OSS/data gateway 310, and status and monitoring information received from the SON Portal 340, to generate SON data. The database server 320 may transmit the SON data to the SON application server 330 via the link 313. In addition, the SON portal 340 may transmit control information to the SON application server 330 via the link 315.

The SON application server 330 may process SON data received from the database server 320 and the configuration and control information received from the SON portal 340, to generate SON results. For example, based on reported performance counters mediated in the database server 320, the KPIs may be monitored and the user defined thresholds described herein may be set in the SON application server 330 to dynamically fine tune $P_{0\_PUSCH}$ and/or $P_{0\_PUCCH}$ values. The SON application server 330 may also transmit configuration and control information to the SON portal 340 via the link 315 and SON results to the database server 320 via the link 313. The SON portal 340 may transmit and receive communications, to and from the database server 320, regarding status and monitoring. The database server 320 may transmit extensible markup language ("XML") and/or binary ("BIN") data to the OSS/data gateway 310 via the link 312. The OSS/data gateway 310 may transmit the XML/BIN data to a network device 301-301 via the link 311 (e.g., the downlink 311-B).

The system 300 may be used to determine optimized $P_{0\_PUSCH}$ and $P_{0\_PUCCH}$ values that may, e.g., reduce UL interference and improve UL capacity and throughput. The SON application server 330 and/or the SON portal 340 may be configured to receive network performance information from Performance Management (PM) counters and configuration information from a database server 320. The SON application server 330 and/or the SON portal 340 may also monitor a plurality of KPIs, compare the KPIs to respective thresholds, and determine optimized $P_{0\_PUSCH}$ and $P_{0\_PUCCH}$ values that may, e.g., improve the overall sector/radio service area throughput, combat negative effects of increased UL RSSI, and prevent increased UL RSSI. In at least some examples, the SON portal 340 may direct the SON application server 330 to determine, and return to the SON portal 340, indications for optimized $P_{0\_PUSCH}$ and $P_{0\_PUCCH}$ values. The SON portal 340 may also control the OSS/data gateway 310 to transmit indications for optimized $P_{0\_PUSCH}$ and $P_{0\_PUCCH}$ values to one or more of the network devices 301-303. Each cell site in a radio cluster may be configured to use optimized $P_{0\_PUSCH}$ and $P_{0\_PUCCH}$ values that are based on characteristics such as UL throughput, UL interference, block error rate ("BLER"), and MCS in real-time or near real-time.

One or more of the OSS/data gateway 310, the database server 320, the SON application server 330, the SON portal 340, and a system or a device 350 may be combined in a single system or device. For example, one or more of the above devices may be included in a standalone network device configured to communicate with a network device 301-303. In addition, one or more of the OSS/data gateway 310, the database server 320, the SON application server 330, the SON portal 340, and a system or a device 350 may be combined with a network device such that the network device may perform some or all of the processes described herein for dynamically adjusting uplink power values. As another example, a SON portal 340 or a SON application server 330 may operate in a distributed or centralized manner such that some or all of the processes of a SON portal 340 and/or a SON application server 330 may be performed by a plurality of devices in the system 300 or within a single device in the system 300.

Figure 3B:
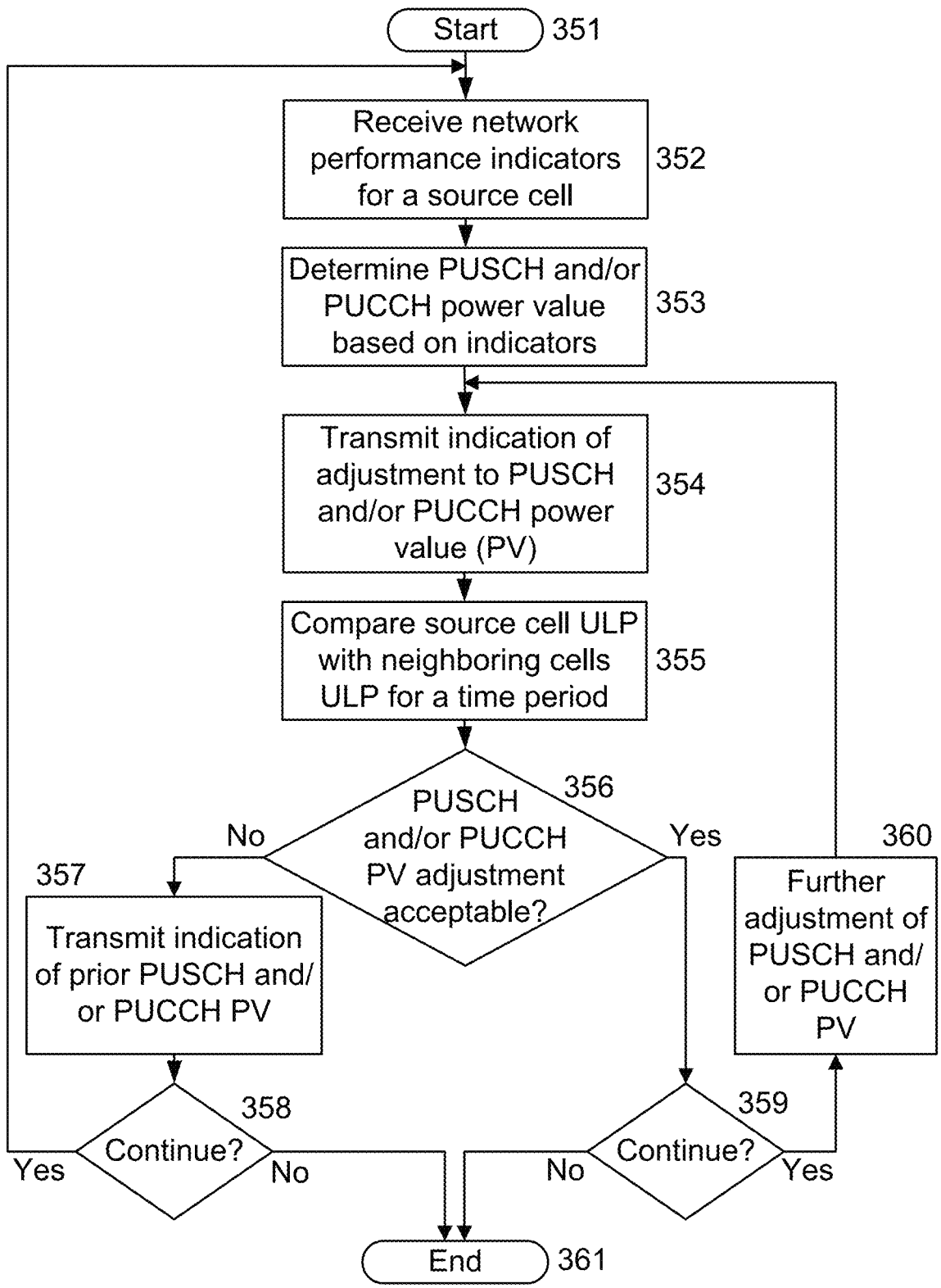
FIG. 3B is a flowchart summarizing example processes for dynamic uplink power control.

FIG. 3B shows an example of a process for determining an adjustment to a power value, including one or both of a $P_{0\_PUSCH}$ value and a $P_{0\_PUCCH}$ value. The process described below with respect to FIG. 3B may be implemented in the network 100 described above regarding FIG. 1A, by device 200 described above regarding FIG. 2, and/or using channels 123-125 described above regarding FIG. 1B. The process described below with respect to FIG. 3B additionally or alternatively may be implemented by any one or more elements of the system 300 described above regarding FIG. 3A. Some or all of the process described below with respect to FIG. 3B may be implemented in a network device (e.g., a base station or an eNB), in a Self-Optimized Network or in any one or more devices included therein (e.g., described above with respect to FIG. 3A) that may be in communication with the network 100, in one or more devices located in the network 100 or external to the network 100, or in any combination thereof. Power values may also be transmitted from any device to any other device, including, e.g., from a first network device to a second network device, or from a network device to gateway, server, portal, or database. Methods and apparatuses described herein may be implemented by any suitable computing device, such as a base station or other network device. Herein these steps may be generally described as implemented on computing devices, but it will be understood that one or more steps and features may be implemented on a base station or other network device.

The process described with respect to FIG. 3B may begin at step 351, such as upon a wireless device entering a cell area, or at any other time, to determine a new power value for uplink transmission power in a first cell 101 (e.g., for a $P_{0\_PUSCH}$ value for transmissions on the PUSCH channel 132, or for a $P_{0\_PUCCH}$ value for transmissions on the PUCCH channel 213). At or before step 351, a network device 103 in the first cell 101 may have an initial power value (e.g., an initial $P_{0\_PUSCH}$ value and/or an initial $P_{0\_PUCCH}$ value).

At step 352, network performance indicators for a source cell may be received. The network performance indicators may comprise first data associated with first uplink transmissions and second data associated with second uplink transmissions. The first uplink transmissions may be from a first network device and via a first cell, and the second uplink transmissions may be from one or more second network devices and via one or more second cells. For example, an OSS/data gateway 310 may receive performance indicators in the form of CM, PM, and/or FM traces via an uplink 311-B from a network device 301-303, including, e.g., from a base station or an eNB. Additionally or alternatively, the performance indicators may be received by a database server 320, a SON application server 330, a SON portal 340, and/or another system or device 350. These performance indicators may include indicators of one or more KPI values described herein, such as average uplink ("UL") throughput, UL acknowledgment to negative acknowledgement rate ("UL Ack/Nack Rate"), handover drops, a ratio of power limited transport blocks to total transport blocks, SINR (e.g., a distribution of the SINR values in certain probability distribution function ranges), measured power of a PRB increase, an indication of UL PRB pair utilization (e.g., a distribution that shows the total number of used PRB pairs by available PRB pairs), and an indication of UL scheduling (e.g., successful UL scheduling count, described further below.

At step 353, based on the performance indicators, a $P_{0\_PUSCH}$ and/or $P_{0\_PUCCH}$ value may be determined. For example, if the performance indicators provide that the $P_{0\_PUSCH}$ and/or $P_{0\_PUCCH}$ value for the source cell are less than an average power for PUSCH and/or PUCCH transmissions in the radio cluster that includes the source cell, the $P_{0\_PUSCH}$ and/or $P_{0\_PUCCH}$ value may be increased by a predetermined amount (e.g., 1 dBm, 2 dBm, or 3 dBm). If, however, the performance indicators provide that the $P_{0\_PUSCH}$ and/or $P_{0\_PUCCH}$ value for the source cell are less than an average power for PUSCH and/or PUCCH transmissions in the radio cluster that includes the source cell, the $P_{0\_PUSCH}$ and/or $P_{0\_PUCCH}$ value may be decreased by a predetermined amount (e.g., 1 dBm, 2 dBm, or 3 dBm). In at least some examples, a $P_{0\_PUSCH}$ and/or $P_{0\_PUCCH}$ value may be determined by a SON portal 340 and/or a SON application server 330. Step 353 may be based on measurements over any duration of time, including, e.g., time period T1 described further below regarding FIG. 4.

At step 354, an indication of an adjustment to a $P_{0\_PUSCH}$ and/or $P_{0\_PUCCH}$ value may be transmitted or sent. For example, a SON portal 340 and/or a SON application server 330 may send an indication of an adjustment to a $P_{0\_PUSCH}$ and/or $P_{0\_PUCCH}$ value in the form of SON results and/or configuration and control information described above regarding FIG. 3A. Additionally or alternatively, a database server 320 and/or an OSS/data gateway 310 may send an indication of an adjustment to a $P_{0\_PUSCH}$ and/or $P_{0\_PUCCH}$ value, such as in the form of extensible markup language ("XML") and/or binary ("BIN") data, via link 312 and/or link 311-B described above regarding FIG. 3A.

At step 355, uplink performance of the source cell may be compared with uplink performance of neighboring cells for a time period. The uplink performance indicators may comprise third data associated with third uplink transmissions using a transmission power based on the first power value determined from step 353. The third uplink transmissions may be from the first network device and via the first cell. Additionally, as in step 353, second uplink transmissions may be received from one or more second network devices and via one or more second cells. For example, during a certain time period after an adjustment of a $P_{0\_PUSCH}$ and/or $P_{0\_PUCCH}$ value in a source cell, a SON portal 340 and/or a SON application server 330 may determine whether (and to what extent) the source cell experiences improved uplink performance and whether (and to what extent) neighboring cells experience uplink performance degradation. Improvement and/or degradation in uplink performance may be based on one or more measurements, including, e.g., average uplink ("UL") throughput, UL acknowledgment to negative acknowledgement rate ("UL Ack/Nack Rate"), handover drops, a ratio of power limited transport blocks to total transport blocks, SINR (e.g., a distribution of the SINR values in certain probability distribution function ranges), an indication of UL scheduling (e.g., successful UL scheduling count) before and/or after a change in a power value, measured power of a PRB increase, and an indication of UL PRB pair utilization (e.g., a distribution that shows the total number of used PRB pairs by available PRB pairs). Any of the above measurements may be for a PUSCH channel 132, a PUCCH channel 133, or both. Step 355 may be based on measurements over any duration of time, including, e.g., time period T2 described further below regarding FIG. 4

In dynamic power control described herein, testing cell conditions after an adjustment is made (e.g., increasing or decreasing a wireless device transmission power value) may be in real-time or near real-time (e.g., within seconds, minutes, or hours). For example, a network device may determine in real-time or near real-time whether an adjustment overcomes the call connection failures, and if not, promptly make another adjustment, e.g., in an iterative manner until the call connection failures are overcome. By dynamically troubleshooting using dynamic power control, call connection failures may be addressed quickly (e.g., within seconds, minutes, or hours) which may provide overall greater connection time and lower overhead (e.g., less buffering) in both a source cell and in neighboring cells.

As an example, consider the scenario of the PUSCH being at −108 dBm. If the noise floor, or the overall noise, is also −108 dBm, or within a small difference (e.g., +/−1 or 2 dBm), such as −109 dBm or −107 dBm, problems may arise such as a "sleeping" cell described above. By exercising dynamic power control on the uplink, a cell may be controlled to transmit at a power level above the noise floor, while also ensuring that the transmission power level does not exceed a threshold level above that noise floor in order to conserve resources at both the wireless device and across the network. The transmission power level at a cell may be controlled by setting the $P_{0\_PUSCH}$ value and/or $P_{0\_PUSCH}$ value, or the target power at the network device. The $P_{0\_PUSCH}$ and $P_{0\_PUSCH}$ values may correspond to a power level specified at the network device that the network device wants to see in the uplink from a wireless device for a physical resource block ("PRB") element. Here, the $P_{0\_PUCCH}$ and/or $P_{0\_PUSCH}$ may be dynamically changed at a network device to a higher or lower value based on, e.g., the interference at a particular time instance, the power level of uplink transmissions from the cell that are received by the network device, and error rates.

At step 356, it may be determined whether a $P_{0\_PUSCH}$ and/or $P_{0\_PUCCH}$ value in a source cell provides acceptable results after an adjustment of the power value. For example, based on the comparison from step 355, a SON portal 340 and/or a SON application server 330 may determine whether uplink performance of the source cell improves or uplink performance of neighboring cells does not decrease relative to the source cell's uplink performance, either of which may be an acceptable result, whereby the process may continue at step 359. If, however, uplink performance of the source cell does not improve and uplink performance of neighboring cells decreases relative to the source cell's uplink performance, then it may be an unacceptable result, and the process may continue to step 357. Any threshold or comparison may be used to determine whether uplink performance in the source cell and in neighboring cells are acceptable.

At step 357, if the outcome from step 356 indicates that the adjustment of a $P_{0\_PUSCH}$ and/or $P_{0\_PUCCH}$ value led to an unacceptable result in performance (e.g., via the "No" path from step 356), then an indication of the prior $P_{0\_PUSCH}$ and/or $P_{0\_PUCCH}$ value used before the adjustment from steps 353-354 may be transmitted or sent. For example, as in step 354 above, a SON portal 340 and/or a SON application server 330 may transmit an indication of a $P_{0\_PUSCH}$ and/or $P_{0\_PUCCH}$ value in the form of SON results and/or configuration and control information described above regarding FIG. 3A. Additionally or alternatively, a database server 320 and/or an OSS/data gateway 310 may transmit an indication of a $P_{0\_PUSCH}$ and/or $P_{0\_PUCCH}$ value such as in the form of extensible markup language ("XML") and/or binary ("BIN") data, via link 312 and/or link 311-B described above regarding FIG. 3A. At step 358, it may be determined whether to repeat the above process, e.g., at a later time period (e.g., via the "Yes" path from step 358), or to end the process at step 361 (e.g., via the "No" path from step 358).

At step 359, if the outcome from step 356 indicates that the adjustment of a $P_{0\_PUSCH}$ and/or $P_{0\_PUCCH}$ value led to an acceptable result in performance (e.g., via the "Yes" path from step 356), then it may be determined whether to repeat the above process, e.g., by further increasing or decreasing the $P_{0\_PUSCH}$ and/or $P_{0\_PUCCH}$ value. For example, a SON portal 340 and/or a SON application server 330 may determine that uplink performance of the source cell may improve further, or would not necessarily decrease or lead to a degradation of neighboring cell uplink performance, if an additional adjustment to the $P_{0\_PUSCH}$ and/or $P_{0\_PUCCH}$ value is made. If so, then, at step 360, a further adjustment may be made by further increasing or decreasing the $P_{0\_PUSCH}$ and/or $P_{0\_PUCCH}$ value, such as by a predetermined amount (e.g., 1 dBm, 2 dBm, or 3 dBm), and the process may return to step 354, whereby steps 354-356 may be repeated. If not, then the process may end at step 361 (e.g., via the "No" path from step 359).

In dynamic uplink power control, connection failure rate may be monitored at a network device and wireless device power levels may be adjusted in response to connection failure conditions. For example, a determination by a network device that a negative acknowledge ("NACK") rate has reached a high level (e.g., 10%, 11%, or above 11%, with an acceptable call volume and/or increase in connection failure rate) may be an indication that a control channel failure has occurred. Such a control channel failure could be the result of interference from neighboring cells. In response, the network device may adjust $P_{0\_PUCCH}$ and $P_{0\_PUSCH}$ values and transmit the new values via a broadcast signal to the wireless devices in the cell of the network device. Because a network may include many cell sites, e.g., tens of thousands or more cell sites, the $P_{0\_PUCCH}$ and $P_{0\_PUSCH}$ values may not be able to be accurately tuned across all cell sites such as by adjusting them by small amounts, e.g., 1, 2, or 3 dBm, only based on their distance to another cell site. The load of each of the cells on a network device and an adjacent network device may be measured, e.g., in addition these distances, and used to more finely tune $P_{0\_PUCCH}$ and $P_{0\_PUSCH}$ values.

Figure 4:
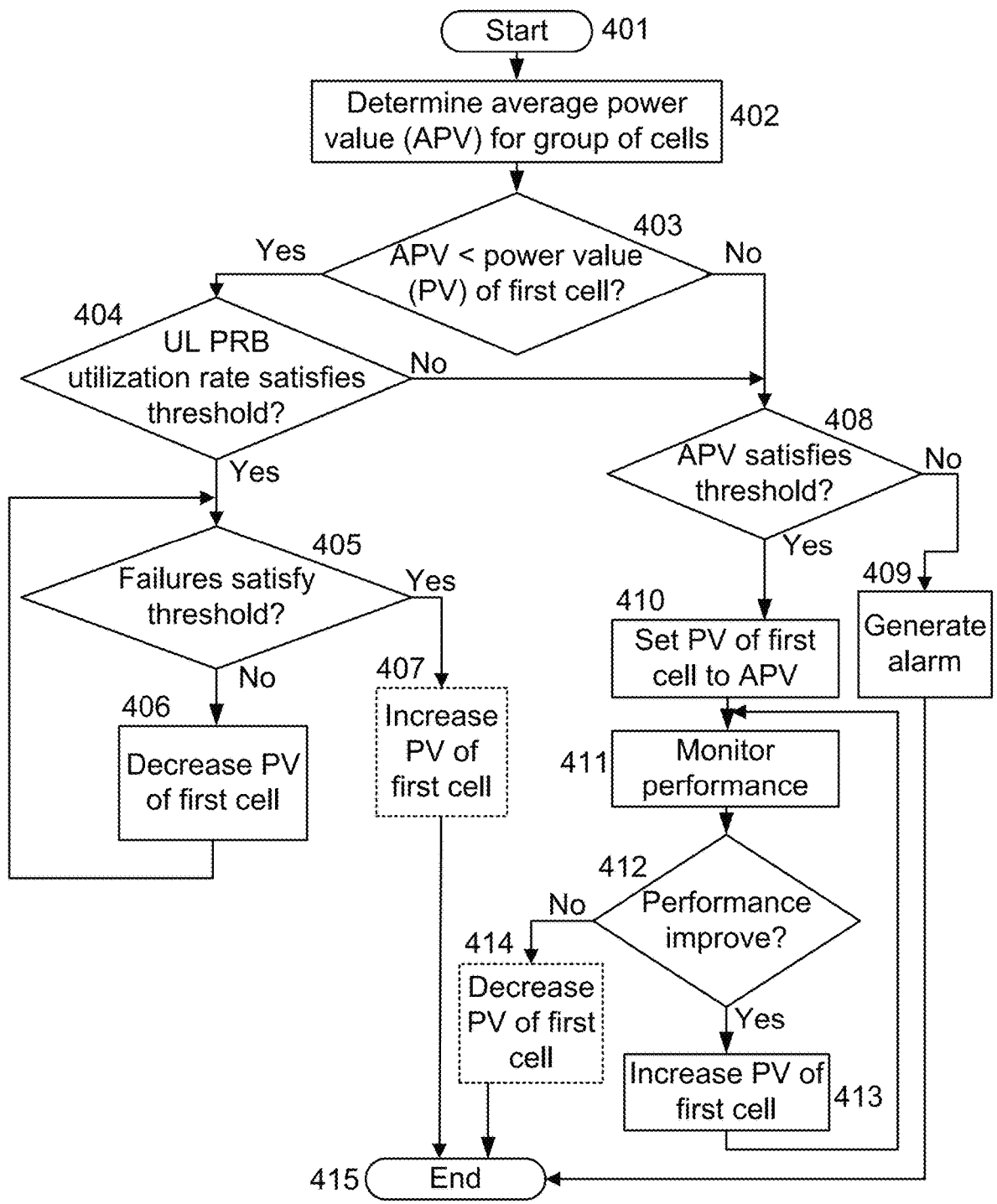
FIG. 4 is a flowchart summarizing example processes, in addition to or in the alternative to those in FIG. 3B, for dynamic uplink power control.

FIG. 4 shows an example of a process for determining a power value, including one or both of a $P_{0\_PUSCH}$ value and a $P_{0\_PUCCH}$ value, that may be performed in addition to or in the alternative to the process described above regarding FIG. 3B. The example process described regarding FIG. 4 includes determining whether and to what extent one or more power values may be decreased, increased, or remain unchanged. This process may be implemented in the network 100 described above regarding FIG. 1A, by device 200 described above regarding FIG. 2, and/or using channels 123-125 described above regarding FIG. 1B. Additionally or alternatively, this process may be implemented by any one or more elements of the system 300 described above regarding FIG. 3A.

The process may begin at step 401, such as if a wireless device enters a cell area or at any other time, to determine a new power value for uplink transmission power in a first cell 101 (e.g., for a $P_{0\_PUSCH}$ value for transmissions on the PUSCH channel 132, or for a $P_{0\_PUCCH}$ value for transmissions on the PUCCH channel 133). At or before step 401, a network device 103 in the first cell 101 may have an initial power value (e.g., an initial $P_{0\_PUSCH}$ value and/or an initial $P_{0\_PUCCH}$ value).

At step 402, an average power value for a group of cells may be determined. For example, the group of cells may include some or all neighboring cells (e.g., including a second cell 111) of a first cell 101. Measurements may be made on a physical resource block ("PRB") level across a Radio Cluster ("RC") and subsequently stored, or provided for real-time or near real-time processing. For example, each PRB may have a different power level, and each frequency may be assigned a different channel number. Information may be collected on a PRB over time for a cell and its neighboring cells. As an example, a power level of −110 dBm may be determined for a first cell 101, and a power level of −109 dBm may be determined for a second cell 111, neighboring the first cell 101. A first network device 104 associated with the first cell 111 may communicate with a second network device 113 associated with the second cell 111 to determine whether the second cell 111 has uplink transmission in a particular time (e.g., within a millisecond or a quarter of a millisecond), based on PRB assignments of the second cell. By identifying which resource blocks are allocated at which time in the second cell, a network device 104 associated with the first cell 101 may determine a noise floor and increase its transmission power to be above that noise floor.

An RC may contain all neighboring cells as members, including itself. Automated Neighbor Relations ("ANR") refers to cell neighbor relations that may be built automatically if a wireless device undergoes a handover from one cell to another cell. As an example, if there are transactions between cells, such as between a first cell and a second cell, or a third cell and a first cell, those transactions may be recorded and links may be generated in the ANR. Each network device may have its own RC based on its respective neighboring cell sites. Each network device may communicate with other network devices of the RC, e.g., via an X2 or a Self-Optimized Network ("SON"), to provide power values and average power values across the RC.

At step 403, the average power value ("APV") determined at step 402 may be compared with a power value of a first cell 101. If average power value is less than the power value of the first cell 101, then the process continues at step 404 via the "Yes" path, which includes considerations for whether to decrease a power value. For example, if the average power of transmissions on a PUSCH channel 132 or a PUCCH channel 133 across the RC is (e.g., −108 dBm) less than a power value for a network device in the first cell 101 (e.g., −106 dBm), it may be an indication that the power value should be decreased. If the average power value is not less than a power value of the first cell 101, then the process continues at step 408 via the "No" path, which includes considerations for whether to increase a power value. For example, if the average power of transmissions on a PUSCH channel 132 or a PUCCH channel 133 across the RC is (e.g., −108 dBm) greater than or equal to a power value for a network device in the first cell 101 (e.g., −110 dBm), it may be an indication that the power value should be increased. While the result of step 403 may be an indication of whether a power value should be decreased or increased, it may not necessarily be determinative of either outcome. For example, as discussed below, a result of step 404 may be an indication that a power value should be considered for an increase rather than a decrease.

At step 404, it may be determined whether an uplink PRB utilization rate satisfies a threshold. For example, the uplink PRB utilization rate may be determined to satisfy a threshold when it is equal to or greater than a minimum uplink PRB utilization rate, such as 1%, 2%, 5%, 10%, or any other percentage sufficient to represent operating conditions in a network. If uplink PRB utilization rate does not satisfy the threshold, then there may be insufficient data to determine whether uplink transmission power may be decreased while maintaining satisfactory performance in the cell, such as a threshold level of successful call connections, and the process may return to determining whether to increase or maintain the current uplink transmission power (e.g., via the "No" path from step 404 discussed below). For example, consider a cell in which there are three wireless devices, with one of the wireless devices close and connected to the network device and two of the wireless devices far away from and not connected to the network device. In this example, the uplink PRB utilization rate may be relatively low (e.g., less than 95% or 90%), due to the two wireless devices that are far away from the network device. Those two wireless devices could be causing interference for the network device while not utilizing uplink PRBs. In such a scenario, it may be more likely that an increase (e.g., via the "No" path from step 404), and not a decrease (e.g., via the "Yes" path from step 404), in uplink power would improve performance in the cell by enabling the two far away wireless devices to utilize uplink PRBs. By requiring a threshold level of uplink PRB utilization, interference caused by wireless devices that are not utilizing PRBs may be less likely to result in an unnecessary or undesirable decrease in uplink power.

An uplink PRB utilization rate may be determined as follows. A distribution may be determined that shows uplink PRB pair utilization, e.g., a ratio of used PRB pairs to available PRBs on a channel, such as the PUSCH or PUCCH. Examples of probability distribution function ("PDF") ranges are provided in Table 1-A and Table 1-B below:

TABLE 1-B

[0]: 0% <= utilization < 10%
[1]: 10% <= utilization < 20%
[2]: 20% <= utilization < 30%
[3]: 30% <= utilization < 40%
[4]: 40% <= utilization < 50%
[5]: 50% <= utilization < 60%
[6]: 60% <= utilization < 70%
[7]: 70% <= utilization < 80%
[8]: 80% <= utilization < 90%
[9]: 90% <= utilization

TABLE 1-A

[0]: 0% <= utilization < 10%
[1]: 10% <= utilization < 40%
[2]: 40% <= utilization < 70%
[3]:
[4]:
[5]:
[6]:
[7]: 70% <= utilization < 90%
[8]:
[9]: 90% <= utilization In the above Table 1-A and Table 1-B, PDF[0] to PDF[9] correspond to PDFs comprising ten discrete levels. In Table 1-B, these levels are spaced equally by 10% utilization differences, whereas levels in Table 1-A have non-linear spacing with only five of the ten levels being used. Any number of levels may be used for the PDF, and any spacing between levels (e.g., including linear or non-linear spacing) may be used. The "utilization" in Table 1-A and Table 1-B may correspond to one or more samples (e.g., averaged samples) of a ratio of used PRB pairs to available PRBs on a channel, such as the PUSCH or PUCCH, during a sample period that may correspond to any duration, such as the duration of T1, described below. A PRB utilization of a network device, or an access point, may be referred to as "APPRBUtilUl," referenced further below.

Any modulation and coding scheme ("MCS") may be used for uplink transmissions, such as 16-Quadrature Amplitude Modulation ("16-QAM"), Quadrature Phase Shift Keying ("QPSK" or 4-QAM), or a higher or lower n level of n-QAM. Each MCS may have a respective threshold for successful uplink allocations. For each PRB of a cell of a network device, a determination may be made as to whether a utilization rate of that resource is above a predetermined minimal value, such as 1%, 5%, 10%, or 15%. If a minimum threshold of PRB utilization is not reached, then measurements may not be indicative of typical operating conditions, and uplink transmission power adjustments in response to the measurements may not have a desired or expected result, such as improving call connections success rate and/or increasing bandwidth.

The time period for determinations in this step 404 may be referred to as T1. During time T1, a network device may monitor historical statistics for a power value. As an example, this time interval could be from 5 minutes to 10, 15, 20, 25, or 30 minutes. T1 could also be on the order of seconds, less than 5 minutes, or more than 30 minutes. T1 could also be on the order of hours, days, weeks, or months, although a shorter time frame may provide faster responsiveness to network conditions. Time interval T1 may also be adjusted, e.g., depending on the resulting KPI parameters and any preferred ranges of values for the parameters. While time periods are included as examples, any of the processes shown and described with respect to FIG. 4, including step 404, may be performed at any time, including simultaneously, near simultaneously, in real-time, near real-time, or over any duration of time.

At step 405, it may be determined whether a failure threshold is satisfied. For example, during a particular time period, a threshold may be one or more of a certain distribution of SINR values, a ratio of transport blocks scheduled in the uplink that are power limited, or a number of received scheduling requests via RACH (e.g., due to a failure from the wireless device to access the network device by means of a scheduling request over PUCCH). Examples of such thresholds are provided and described in more detail with respect to step 507 of FIG. 5A (e.g., regarding PUSCH transmissions) and step 607 of FIG. 6A (e.g., regarding PUCCH transmissions), incorporated by reference here. If a failure threshold is satisfied, the process may end at step 415 (e.g., via "Yes" path from step 405). If a failure threshold is not satisfied, the process continues to step 406 (e.g., via "No" path from step 405).

The time period for determinations in step 405 may be referred to as T2. During time T2, a network device may monitor historical statistics for a power value, including for a period of time after which a power value may have changed from an initial power value. As an example, this time interval could be from 5 minutes to 10, 15, 20, 25, or 30 minutes. T2 could also be on the order of seconds, less than 5 minutes, or more than 30 minutes. T2 could also be on the order of hours, days, weeks, or months, although a shorter time frame may provide faster responsiveness to network conditions. Also, T2 may be less than T1 (described above regarding step 404) such that historical data may be analyzed during T1 over an extended period of time whereas analysis during T2 may be limited to a period after a prior change in a power value or after a prior determination of whether to change a power value has occurred.

At step 406, a power value may be decreased, such as to prevent call connection failures or conserve energy. For example, if multiple wireless devices attempt to connect to a source cell at the same time, the noise floor may increase and each wireless device increases its transmission power in order to reach the network device, which in turn, may further increase the noise floor. Ultimately, wireless devices may not be allowed to transmit above a maximum power level (e.g., $P_{CMAX}$), and as a result of a high noise floor wireless devices may not be able to connect to the network device. To avoid this scenario of wireless devices being unable to reach the network device, a power value may be decreased.

Steps 405 and 406 may be repeated, whereby a power value may be decreased iteratively and by a small amount (e.g., 1, 2, or 3 dBm), until it is determined that a failure threshold is satisfied. If such a determination is made, the process may end at step 415. Optionally, prior to ending at step 415, the power value may be returned to its value just before its last decrease (e.g., at step 407) to ensure that the power value may be minimized but not to the point of satisfying a failure threshold.

Returning to step 408, this step may be performed as part of determining whether to increase a power value. Step 408 may occur if either, at step 403, an average power value is not less than the power value of the first cell 101 (e.g., "No" path from step 403), or, if the determinations from steps 404 indicate, during time period T1, an insufficient uplink PRB utilization (e.g., "No" path from step 404). At step 408, it may be determined whether the average power value satisfies a threshold. This threshold may be, e.g., a vendor defined threshold ("VDT"), a user defined threshold ("UDT"), a maximum allowable transmission power (e.g., $P_{CMAX}$), or any combination thereof. As examples, the threshold may be −93, −96, −98, −100, −102, −103, −105, −107, −110 dBm, or any other value or range of values, above which a wireless device will not increase its transmission power.

In step 408, if the average power value satisfies the threshold, then an alarm may be generated at step 409 and the process may end at step 415. The alarm may inform a system 300 or network 100 that further analysis may be necessary to determine a source of interference in the system that may not be able to be resolved by increasing a power value. If the average power value does not satisfy the threshold, then the process continues to step 410.

At step 410, the power value of the first cell 101 may be set to the average power value. Thereafter, at step 411, the performance of the first cell and its neighboring cells may be monitored, e.g., for a duration of time T2. For example, a network device may monitor historical statistics after a power value is adjusted. This time interval may be 5, 10, or 15 to 30 minutes, or on the order of seconds, or more than 30 or less than 5 minutes, or 1 or more hours or other suitable time interval. In particular, during step 411, the performance of a source cell may be monitored so that the uplink performance ("ULP") of neighboring cells may be analyzed, e.g., to determine whether degradation occurs in ULP of neighboring cells after a power value may be changed in the source cell.

At step 412, it may be determined whether ULP of the first cell 101 improves or ULP of neighboring cells does not decrease relative to the first cell's ULP. Degradation in ULP of neighboring cells may be determined based on one or more measurements, including, e.g., average uplink ("UL") throughput, UL acknowledgment to negative acknowledgement rate ("UL Ack/Nack Rate"), handover drops, a ratio of power limited transport blocks to total transport blocks, SINR (e.g., a distribution of the SINR values in certain probability distribution function ranges), measured power of a PRB increase, an indication of UL PRB pair utilization (e.g., a distribution that shows the total number of used PRB pairs by available PRB pairs), and an indication of UL scheduling (e.g., successful UL scheduling count) before and/or after a change in a power value. Any of the above measurements may be for a PUSCH channel 132, a PUCCH channel 133, or both. Based on one or more of the above measurements, if ULP of the first cell 101 improves or ULP of neighboring cells does not decrease relative to the first cell's ULP, then the process continues to step 413 (e.g., via the "Yes" path from step 412). Otherwise, the process may end at step 415 (e.g., via the "No" path from step 412). Optionally, at step 414, prior to ending at step 415, the power value of the first cell may be decreased (e.g., returned to a prior value such as its power value prior to step 410).

At step 413, a power value may be increased (e.g., by 1, 2, or 3 dBm, or any other value) and step 411 may be repeated to determine whether the power value should be increased further. During a repeat of step 411, if occurring (e.g., based on a "Yes" result from step 412), T2 may include the same or different duration as T2 from the prior step 411 and measurements may be for the time period occurring after the increase of the power value at step 413. In this iterative process, the power value may be increased gradually, while the impact of the increase may be assessed relative to whether degradation in ULP of neighboring cells occurs with respect to the source cell and/or whether degradation or no change occurs in the performance of the source cell. For example, if after a period T2 during which the transmission power has been at an increased level, call connection rates do not increase, then the transmission power may be increased by another step (e.g., 1, 2, or 3 dBm, or another amount), before repeating the performance tests of step 411. If, however, call connection rates increase, then it may be determined whether any further increases should be attempted or whether the transmission power should be set to the previously increased level. Ultimately, if both degradation in ULP of neighboring cells with respect to the source cell and degradation, or no change, in performance of the source cell occurs even after an increase in the power value, it may be determined, at step 412, that no further adjustments to the power value should be made and the process may end at step 415. As above, optionally, at step 414, prior to ending at step 415, the power value of the first cell may be decreased (e.g., returned to a prior value such as its power value prior to its last increase from step 413).

The above process of FIG. 4 may be used to determine one or both of a $P_{0\_PUSCH}$ value and a $P_{0\_PUCCH}$ value. FIGS. 5 and 6, described below, provide further details for determining a $P_{0\_PUSCH}$ value and a $P_{0\_PUCCH}$ value, respectively.

Figure 5A:
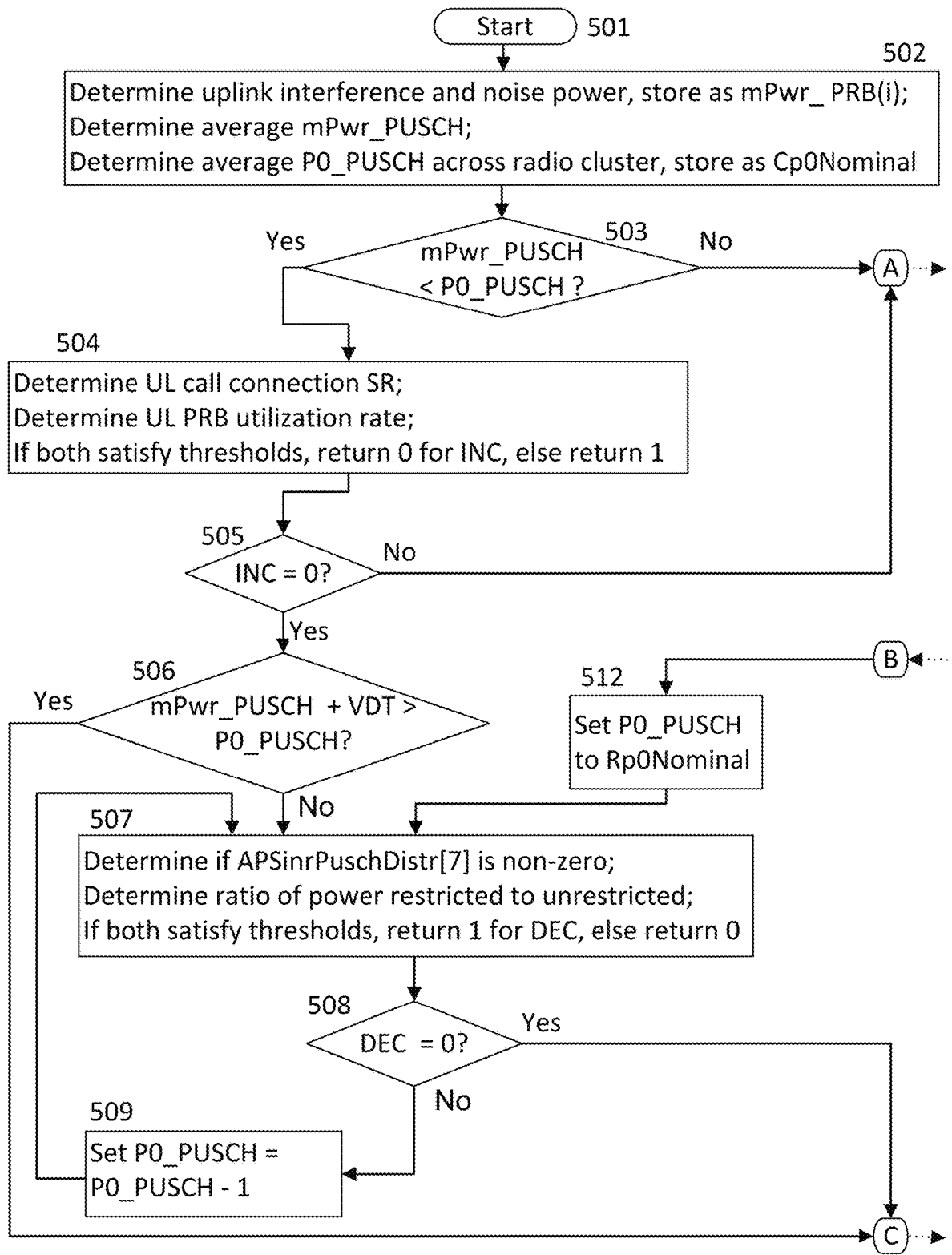
FIG. 5A and FIG. 5B are a flowchart summarizing example processes, in addition to or in the alternative to those in FIGS. 3B and 4, for dynamic uplink power control of PUSCH transmissions.
Figure 5B:
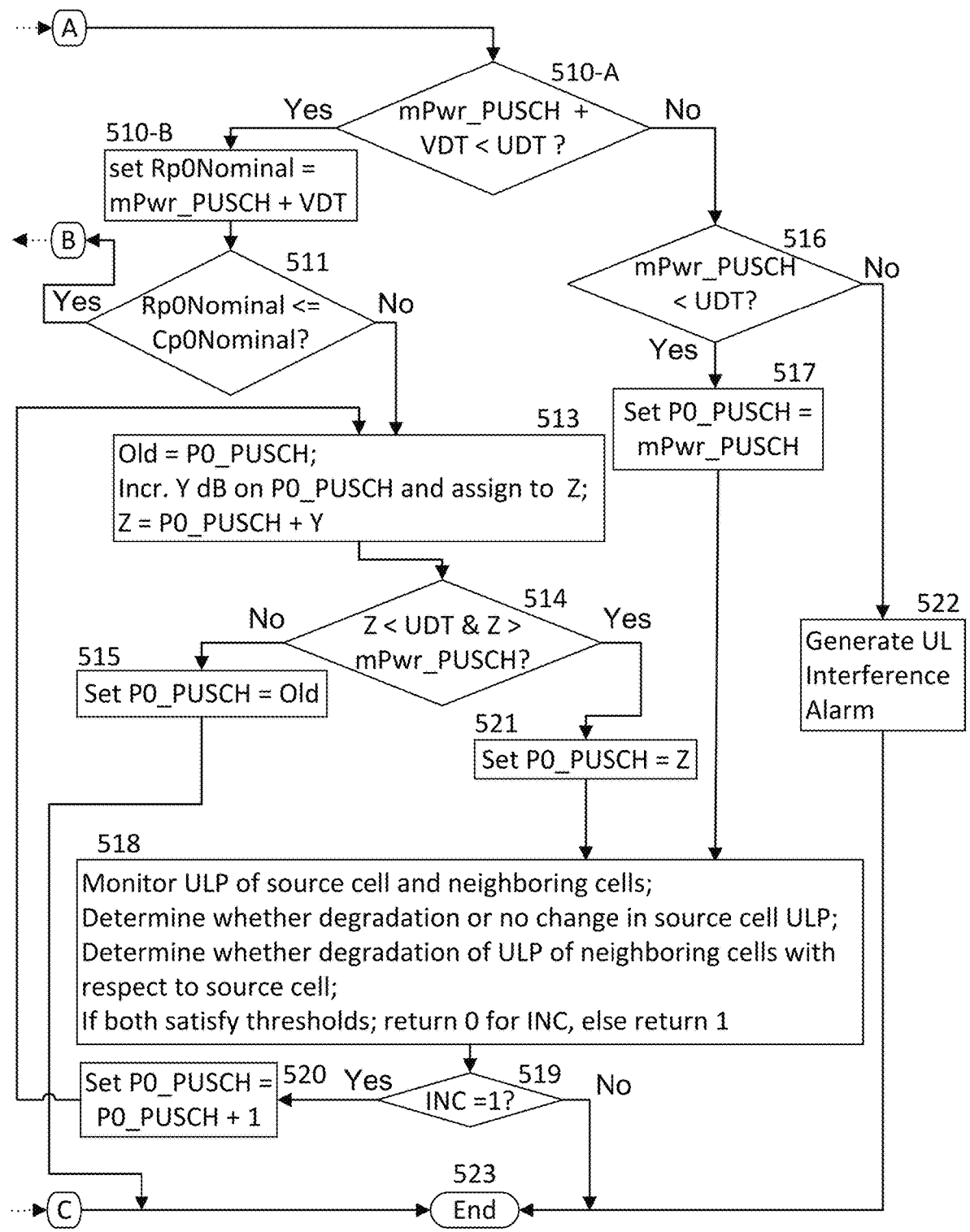

FIG. 5A and FIG. 5B show an example of a process for determining a $P_{0\_PUSCH}$ value, and in particular, whether and to what extent it may be decreased, increased, or remain unchanged. The process described below with respect to FIG. 5A and FIG. 5B may be implemented in the network 100 described above regarding FIG. 1A, by device 200 described above regarding FIG. 2, and/or using channels 123-125 described above regarding FIG. 1B. Additionally or alternatively, this process may be performed by any one or more elements of the system 300 described above regarding FIG. 3A. Any portion of this process may also be performed in addition to or in the alternative to any portion of the processes described above regarding FIG. 3B and FIG. 4 or below regarding FIG. 6A and FIG. 6B. The process may begin at step 501 in FIG. 5A, such as if a wireless device enters a cell area or at any other time, to determine a new $P_{0\_PUSCH}$ value for uplink transmission power of a wireless device. At or before step 501, a network device may have an initial $P_{0\_PUSCH}$ value, or "$P_{0\_PUSCH}$".

At step 502, a device such as a network device may determine received interference and noise power on a PUSCH channel on a per physical resource block basis on all receive ports of the device during a "no allocation" time period in the uplink. This received interference and noise power may be stored and/or designated as mPwr_PRB(i). In the value mPwr_PRB(i), "mPwr_PRB" represents the measured power of a physical resource block ("PRB"), and "i" represents $i^{th}$ PRB. As an example, in a 20 MHz system there may be one-hundred PRBs, where mPwr_PRB(0) represents the $0^{th}$ PRB and mPwr_PRB(99) represents the $99^{th}$ PRB. In a 10 MHz system, the range for PRBs may be 0-49, and in a 5 MHz system the range for PRBs may be 0-25. For each PRB, measurements may be made across a Radio Cluster ("RC") and subsequently stored, or provided for real-time or near real-time processing. For example, each PRB may have a different power level, and each frequency may be assigned a different channel number. Information may be collected on a PRB over time for a cell and its neighboring cells. As an example, a power level of −110 dBm may be determined for a first cell, and a power level of −109 dBm may be determined for a second cell neighboring the first cell. A first network device associated with the first cell may communicate with a second network device associated with the second cell to determine whether the second cell has uplink transmission in a particular time (e.g., within a millisecond or a quarter of a millisecond), based on PRB assignments of the second cell. By identifying which resource blocks are allocated at which time in the second cell, a network device associated with the first cell may determine a noise floor and increase its transmission power to be above that noise floor.

In some instances, increasing a wireless device transmission power above the noise floor may still be insufficient to avoid connection failures. For example, channel noise may be present within a cell caused by a device (e.g., a modem) that may not be in communication with a network device in that cell. In addition, such channel noise may be intermittent, e.g., present during business hours and absent outside of business hours if the interfering device may be turned off. Accordingly, if a source of noise may be determined to be from such an interfering device, an alarm may be generated (such as discussed further below) that may indicate a different PRB should be utilized. Thus, PRB reallocation may be performed in addition to, or in the alternative to, increasing wireless device transmission power above a noise floor.

At step 502, an average power of PUSCH transmissions across the RC may be measured and/or stored as "mPwr_PUSCH." In a 20 MHz system that may have one-hundred PRBs, an average mPwr_PUSCH corresponds to an average value of mPwr_PRB(0) through mPwr_PRB (99). Also, an average $P_{0\_PUSCH}$ value across an RC may be determined and/or stored as "Cp0Nominal." An RC may contain all neighboring cells as members, including itself. In LTE, Automated Neighbor Relations ("ANR") refers to cell neighbor relations that may be built automatically if a wireless device undergoes a handover from one cell to another cell. As an example, if there are transactions between cells, such as between first cell and a second cell, or a third cell and a first cell, those transactions may be recorded and links may be generated in the ANR. Each network device may have its own RC based on its respective neighboring cell sites. Each network device may communicate with other network devices of the RC, e.g., via an X2 or a Self-Optimized Network ("SON"), to provide values for mPwr_PRB(i) and mPwr_PUSCH across the RC.

The received noise and interference power on a PUSCH channel determined in step 502 may correspond with a PDF shown below in Table 2:

TABLE 2

| |
|---|
| [0]: N + I <= −121 |
| [1]: −121 < N + I <= −120 |
| [2]: −120 < N + I <= −119 |
| [3]: −119 < N + I <= −118 |
| [4]: −118 < N + I <= −117 |
| [5]: −117 < N + I <= −116 |
| [6]: −116 < N + I <= −115 |
| [7]: −115 < N + I <= −114 |
| [8]: −114 < N + I <= −113 |
| [9]: −113 < N + I <= −112 |
| [10]: −112 < N + I <= −108 |
| [11]: −108 < N + I <= −104 |
| [12]: −104 < N + I <= −100 |
| [13]: −100 < N + I <= −96 |
| [14]: −96 < N + I <= −92 |
| [15]: −92 < N + I |

In Table 2 above, the PDF includes sixteen levels, PDF[0] to PDF[15], where "N+I" corresponds to received noise ("N") and interference ("I") power on a PUSCH channel. The values in Table 2 correspond to units of dBm per PRB. For received noise and interference power measurements, a wideband value for the frequency domain may be measured in each valid uplink subframe. One or more counters for the PDF ranges may be reset after a measurement period that may be any period of time, such as T1 or T2 described below. The measured received noise and interference power for a PUSCH channel may be referred to as "APMeasRecInterferencePowrPusch." In addition, accumulated interference power for each of "i" PRB(i) (e.g., PRB(0) to PRB(99)) may be determined, and may be referred to as "APMeasRecInterferencePowrPrb(i)." The accumulated interference power for each PRB may be measured by units of 1 mW*$2^{-22}$, and samples may be summed over a measurement period that may be any period of time, such as T1 or T2 described below. These samples may also be averaged over receive antennas (e.g., for all wireless devices across cells of a Radio Cluster), and the samples may be measured for each PRB per each 100 ms. One or more counters may be used for the PRB interference power measurements and may be reset after a measurement period that may be any period of time, such as T1 or T2 described below.

At Step 503, the value mPwr_PUSCH determined at step 502 may be compared with $P_{0\_PUSCH}$ for a device such as a network device. If mPwr_PUSCH is less than $P_{0\_PUSCH}$, then the process continues at step 504 via the "Yes" path, which includes considerations for whether to decrease the $P_{0\_PUSCH}$ value. For example, if the average power of PUSCH transmissions across the RC (e.g., −108 dBm) is less than the $P_{0\_PUSCH}$ value for a network device (e.g., −106 dBm), it may be an indication that the $P_{0\_PUSCH}$ value should be decreased. If mPwr_PUSCH is not less than the $P_{0\_PUSCH}$ value, then the process continues at step 510-A via the "No" path and label "A" connecting FIG. 5A to FIG. 5B, which includes considerations for whether to increase the $P_{0\_PUSCH}$ value. For example, if the average power of PUSCH transmissions across the RC (e.g., a $P_{0\_PUSCH}$ value of −108 dBm) is greater than or equal to the average PUSCH transmission power for a network device (e.g., a $P_{0\_PUSCH}$ value of −110 dBm), it may be an indication that the $P_{0\_PUSCH}$ value should be increased. While the result of step 503 may be an indication of whether the $P_{0\_PUSCH}$ value should be decreased or increased, it may not necessarily be determinative of either outcome. For example, as discussed below, a result of step 505 may be an indication that the $P_{0\_PUSCH}$ value should be considered for an increase rather than a decrease (e.g., via label "A" connecting FIG. 5A to FIG. 5B), and a result of step 511 (described below regarding FIG. 5B) may be an indication that the $P_{0\_PUSCH}$ value should be considered for a decrease rather than an increase (e.g., via label "B" connecting FIG. 5B to FIG. 5A).

At step 504, determinations may be made as to whether uplink allocations are successful (e.g., a call connection success rate) during a particular time period and with at least a minimum uplink PRB utilization. For example, if call connections are 100% successful, or are within a threshold level of success (e.g., 99, 98, 97, 96, 95 or another % successful), it may be determined whether uplink transmission power may be reduced while maintaining such a call connection success rate, and if so, what may be the maximum power level decrease that achieves it (e.g., via the "Yes" path from step 505 discussed below). Similarly, if call connections are not 100% successful, or are not within a threshold level of success (e.g., 99, 98, 97, 96, 95 or another % successful), it may be determined whether an increase in uplink transmission power may achieve the desired call connection success and, if so, what may be the minimum power level increase that achieves it (e.g., via the "No" path from step 505 discussed below).

A call connection success rate may be determined as follows. A wireless device may send a request for a resource block (e.g., PRB) in a RACH preamble via in an uplink carrier to a network device. In response, the network device may send a message with a PRB allocation via a downlink carrier to the wireless device. Thereafter, the network device may expect a call connection to be established by the wireless device based on the PRB allocation. However, in some instances, such as due to downlink interference, the wireless device may not receive the response message and, as a result, the wireless device may send another request for a resource block. During a time period (e.g., T1, described below), the wireless device may determine the number of times it transmitted a request for a resource block, and how many times it received a message in response from the network device, to determine a call connection success rate (e.g., ratio of responses to requests). The wireless device may transmit the call connection success rate and/or related information to a device such as a network device, which may further transmit to additional devices in the network described above with respect to FIG. 3A, for use in dynamically determining uplink transmission power.

Dynamic power control may account for a variety of devices, such as in a local area network, that may use a wireless device or an access point ("AP") to communicate via a network connection. For example, a wireless device may be configured to operate as a personal hotspot for other devices associated with the user, such as a smartphone operating as a hotspot for a user's laptop computer to access the Internet via the network connection of the wireless device. Other devices that may be configured to communicate with a wireless device or AP, and in turn, communicate via a network connection, include a modem, computer, tablet, television, camera, secondary phone (e.g., smartphone), and any Internet-capable device. A wireless device or AP in communication with such devices may transmit its operating conditions to a device such as a network device for determining transmission power. As an example, if an AP is connected to a network and a computer is powered on, connects to the AP, and communicates via a network, it could interfere with a nearby wireless device. A connected wireless device may ordinarily use an assigned uplink control channel to request additional resources to transmit buffered data. The wireless device may interpret a lack of a response received from the network device as an indication that the uplink bandwidth request sent via the uplink control region was not successfully received by the network device. As a result, the wireless device may transmit a request via RACH procedure, similar to a new wireless device joining a network. As an example, in order to avoid interference, the wireless device may transmit a request for a resource block (e.g., PRB) in a RACH preamble to a network device. If an AP detects a response from the network device intended for the wireless device, the AP may determine that it needs to change its power level to avoid interference with the wireless device. Because a wireless device may already have an established RRC Connection, a frequent occurrence of events such as described above may be an indication of control channel interference which may be fine-tuned via adjusting the $P_{0\_PUSCH}$ and/or $P_{0\_PUCCH}$ value.

A call connection success rate may also be determined using static power control based on manually monitoring cell network conditions, but such manual procedures may require data observations over an extended period of time (e.g., days, weeks, or months). Also, even after such an extended period of time, further tests and analyses may be necessary to manually determine and then confirm one or more causes of call connection failures.

At step 504, it also may be determined whether uplink PRB utilization satisfies a threshold. For example, satisfying a threshold may be being equal to or greater than a minimum uplink PRB utilization rate, such as 1%, 2%, 5%, 10%, or any other percentage sufficient to represent operating conditions in a network. If uplink PRB utilization rate does not satisfy the threshold, then there may be insufficient data to determine whether uplink transmission power may be decreased while maintaining a threshold level of successful call connections, and the process may return to determining whether to increase or maintain the current uplink transmission power (e.g., via the "No" path from step 505 discussed below). For example, if ten wireless devices are in a cell and only one of the wireless devices has attempted and succeeded in a call connection, then that single call connection could result in a satisfactory call connection rate (e.g., 100%). However, a single call connection success by one wireless device may not be indicative of a need to decrease uplink power for all wireless devices in the cell if that cell may be experiencing a relatively low uplink PRB utilization rate (e.g., less than 95% or 90%). If the other nine wireless devices in the cell ultimately attempt a call connection request, they may not experience the same success as the first attempt by the first wireless device. And the likelihood that the other nine wireless devices experience a call connection failure may increase if uplink power is reduced based on that single call connection success. By requiring a threshold level of uplink PRB utilization in combination with a satisfactory call connection success rate, the success of a single wireless device or of a small number of wireless devices (e.g., two or three wireless devices) may be less likely to result in an unnecessary or undesirable decrease in uplink power.

As another example, consider a cell in which there are three wireless devices, with one of the wireless devices close and connected to the network device and two of the wireless devices far away from and not connected to the network device. In this example, the uplink PRB utilization rate may be relatively low (e.g., less than 95% or 90%), due to the two wireless devices that are far away from the network device. Those two wireless devices could be causing interference for the network device while not utilizing uplink PRBs and not experiencing call connection failures. In such a scenario, it may be more likely that an increase (e.g., via the "No" path from step 505), and not a decrease (e.g., via the "Yes" path from step 505), in uplink power would improve performance in the cell by enabling the two far away wireless devices to utilize uplink PRBs. As in the previous example, by requiring a threshold level of uplink PRB utilization, in combination with a satisfactory call connection success rate, interference caused by wireless devices that are not utilizing PRBs may be less likely to result in an unnecessary or undesirable decrease in uplink power.

[99] Any modulation and coding scheme ("MCS") may be used for uplink transmissions, such as 16-Quadrature Amplitude Modulation ("16-QAM"), Quadrature Phase Shift Keying ("QPSK" or 4-QAM), or a higher or lower n level of n-QAM. Each MCS may have a respective threshold for successful uplink allocations, and based on a PRB level MCS performance, PRB level interference in nominal load conditions may be determined. For example, during the particular time period, each call connection request that successfully results in a call connection may be added and compared with the number of call connection requests that failed and/or the number of dropped calls. For each PRB of a cell of a network device, a determination may be made as to whether a utilization of that resource is above a predetermined minimal value, such as 1%, 5%, 10%, or 15%. If a minimum threshold of PRB utilization is not reached, then measurements may not be indicative of typical operating conditions, and uplink transmission power adjustments in response to the measurements may not have a desired or expected result, such as improving call connections success rate and/or increasing bandwidth.

The time period for determinations in this step 504 may be referred to as T1. During time T1, a network device may monitor historical statistics for a $P_{0\_PUSCH}$ value. As an example, this time interval could be from 5 minutes to 10, 15, 20, 25, or 30 minutes. T1 could also be on the order of seconds, less than 5 minutes, or more than 30 minutes. T1 could also be on the order of hours, days, weeks, or months, although a shorter time frame may provide faster responsiveness to network conditions. Time interval T1 may also be adjusted, e.g., depending on the resulting KPI parameters and any preferred ranges of values for the parameters. While time periods are included as examples, any of the processes shown and described with respect to FIG. 5A and FIG. 5B, including step 504, may be performed at any time, including simultaneously, near simultaneously, in real-time, near real-time, or over any duration of time.

At step 505, if the determinations from step 504 indicate, during time period T1, a successful allocation for the MCS with a sufficient uplink PRB utilization, then the process may continue to step 506 (e.g., a variable "INC," such as a binary value, may be set to a value of "0"), for further determinations whether to decrease the $P_{0\_PUSCH}$ value. At step 505, if the determinations from step 505 indicate, during time period T1, either an unsuccessful allocation for the MCS, an insufficient uplink PRB utilization, or both, then the process may continue to step 510-A (e.g., the variable "INC" may be set to a value of "1") via label "A" connecting FIG. 5A to FIG. 5B, for further determinations whether to increase the $P_{0\_PUSCH}$ value. Similar to step 503, while the result of steps 504 and 505 may be an indication of whether the $P_{0\_PUSCH}$ value should be decreased or increased, it may not necessarily be determinative of either outcome. For example, as discussed below, a result of step 506 may be an indication that the $P_{0\_PUSCH}$ value should not be changed (e.g., via the "Yes" path and label "C" connecting FIG. 5A to FIG. 5B), and a result of step 511 (in FIG. 5B) may be an indication that the $P_{0\_PUSCH}$ value should be considered for a decrease rather than an increase (e.g., via the "No" path and label "B" connecting FIG. 5B to FIG. 5A).

At step 506, a user or vendor defined threshold ("VDT") may be added to the value mPwr_PUSCH determined at step 502 and that sum may be compared with $P_{0\_PUSCH}$ for a network device. The VDT may be any threshold value and may vary depending on the MCS used and any SINR requirement or other network parameters. As an example, VDT may be 15 dBm for 16-QAM. VDT may be any other value, and additional examples include but are not limited to +/−1, 2, 3, 4, 5, 10, 12, 16, 18, 20, 22, or 25 dBm. The VDT may vary, e.g., depending upon receiver sensitivity of hardware in use that may be designed and manufactured by different vendors. Due to these differences, establishing a VDT may ensure that a wireless device transmission power is maintained above a noise floor. If the sum of mPwr_PUSCH and VDT is not greater than $P_{0\_PUSCH}$, then the process continues at step 507 via the "No" path, which includes considerations for whether to decrease the $P_{0\_PUSCH}$ value. For example, if the average power of PUSCH transmissions across the RC added to VDT yields a sum (e.g., −108 dBm) that is not greater than the $P_{0\_PUSCH}$ value for a network device (e.g., −106 dBm), it may be an indication that the $P_{0\_PUSCH}$ value should be decreased. If the sum of mPwr_PUSCH and VDT is greater than $P_{0\_PUSCH}$, then the process ends at step 523 via the "Yes" path and label "C" connecting FIG. 5A to FIG. 5B, wherein a determination may be made not to decrease the $P_{0\_PUSCH}$ value and the $P_{0\_PUSCH}$ value remains unchanged. By proceeding to step 523 (in FIG. 5B), the process determines that the $P_{0\_PUSCH}$ value may be already set to an acceptable value. For example, if the average power of PUSCH transmissions across the RC plus VDT is (e.g., −100 dBm) greater than the $P_{0\_PUSCH}$ value (e.g., −110 dBm), and the average power of PUSCH transmissions across the RC is less than $P_{0\_PUSCH}$ (e.g., determined at step 503), it may be an indication that the $P_{0\_PUSCH}$ is already at a satisfactory level and need not be decreased or increased at that time.

At step 507, determinations may be made as to whether, during a particular time period (e.g., T2, described below), a distribution of SINR values may be below a threshold level and a threshold level of transport blocks scheduled in the uplink are power limited. As explained above regarding step 504 any modulation and coding scheme ("MCS") may be used for uplink transmissions, such as 16-Quadrature Amplitude Modulation ("16-QAM"), Quadrature Phase Shift Keying ("QPSK" or 4-QAM), or a higher or lower n level of n-QAM. Each MCS may have a respective threshold for a distribution of SINR values. For example, during the particular time period for an MCS of 16-QAM, a threshold value for a distribution of SINR values may be 15 dBm in a probability distribution function ("PDF") in which each 1 dB for a PUSCH transmission yields one sample in the PDF. As another example, for an MCS of 64-QAM, a threshold value for a distribution of SINR values may be 20 dB or more in a PDF function in which each 1 dBm for a PUSCH transmission yields one sample in the PDF. Table 3 below provides examples for a distribution of the SINR value calculated for PUSCH at small cell PDF ranges (e.g., "APSinrPuschDistr").

TABLE 3

| |
|---|
| [0]: SINR <= 0 |
| [1]: 0 < SINR <= 3 |
| [2]: 3 < SINR <= 6 |
| [3]: 6 < SINR <= 9 |
| [4]: 9 < SINR <= 12 |
| [5]: 12 < SINR <= 14 |
| [6]: 14 < SINR <=15 |
| [7]: 15 < SINR |

Table 3 above provides an example of a distribution of SINR values that may be determined for PUSCH, in example PDF ranges. A unit of measurement may be, e.g., 1 dB and each SINR value for a PUSCH transmission may yield one sample in the distribution. A count of SINR values for PUSCH transmissions may be maintained, and the count may be reset after a measurement period (e.g., T2 discussed below). If PDF [7] is a non-zero value, for example, if at least one PUSCH transmission has an SINR greater than 15 dB, then it may be determined that a distribution of SINR values exceeds a threshold level, and one of two requirements in steps 507-508 for decreasing the P0_PUSCH value, in step 509, may be met.

Different tables may be used for different MCS. For example, Table 3 could be used for a 16 QAM MCS, whereas a different table could be used for a 64 QAM MCS having different (e.g., higher) values. For example, the threshold value of 15 dB for 16 QAM could be increased to a threshold value of 20 dB for 64 QAM. Also, step sizes between PDF values may be variable and any level, such as 1 dBm, 2 dBm, or 3 dBm. A greater or lesser number of PDF values may be used (e.g., [0] to [11], or [0] to [5]). In addition, if a difficulty in connecting a call is detected (e.g., call connection failures), the MCS may be adjusted, e.g., from 16 QAM to 64 QAM to improve call connections.

The time period for determinations in step 507 may be referred to as T2. During time T2, a network device may monitor historical statistics for a $P_{0\_PUSCH}$ value, including for a period of time after which a value of $P_{0\_PUSCH}$ may have changed from an initial $P_{0\_PUSCH}$ value. As an example, this time interval could be from 5 minutes to 10, 15, 20, 25, or 30 minutes. T2 could also be on the order of seconds, less than 5 minutes, or more than 30 minutes. T2 could also be on the order of hours, days, weeks, or months, although a shorter time frame may provide faster responsiveness to network conditions. Also, T2 may be less than T1 (addressed above regarding step 504) such that historical data may be analyzed during T1 over an extended period of time whereas analysis during T2 may be limited to a period after a prior change in a $P_{0\_PUSCH}$ value or after a prior determination of whether to change a $P_{0\_PUSCH}$ value has occurred.

A determination of whether a threshold level of transport blocks scheduled in the uplink are power limited, at step 507, may include a comparison of the number of power limited transport blocks relative to the total transport blocks. For example, the number of transport blocks on a MAC level scheduled in an uplink may be referred to as "APMeasTbsPwrRestricted" where the wireless device was power limited and may be referred to as "APMeasTbsPwrUnrestricted" where the wireless device was not power limited. A transport block may be categorized as power limited (or power restricted), e.g., if an estimated required transmit power for transmission of the transport block is higher than the wireless device maximum transmit power (e.g., $P_{CMAX}$). A transport block may be categorized as not power limited (or power unrestricted), e.g., if an estimated required transmit power for transmission of the transport block is equal to or lower than the wireless device maximum transmit power (e.g., $P_{CMAX}$). A count of power limited transport blocks may be included in a power headroom report, described above, indicating a power restriction. A ratio of power limited transport blocks to total transport blocks may be determined as follows: APMeasTbsPwrRestricted/(APMeasTbsPwrRestricted+APMeasTbsPwrUnrestricted). A determination may be made as to whether this ratio is above a threshold value, such as 20, 25, or 30%. Any other value may be used as this threshold value.

At step 508, if the determinations from step 507 indicate, during time period T2, a distribution of SINR values exceeds a threshold level and a threshold level of transport blocks scheduled in the uplink are power limited, then the process may continue to step 509 (e.g., a variable "DEC", such as a binary decision, may be set to a value of 1), at which point the $P_{0\_PUSCH}$ value may be decreased (e.g., by 1, 2, or 3 dBm, or any other value) and step 507 may be repeated to determine whether the $P_{0\_PUSCH}$ value should be decreased further. During a repeat of step 507, T2 may include the same or different duration as T2 from the prior step 507, and measurements may be for the time period occurring after the decrease of the $P_{0\_PUSCH}$ value at step 509. In this iterative process, the $P_{0\_PUSCH}$ value may be decreased gradually, while the impact of a decrease may be assessed relative to whether the distribution of SINR values is below a threshold level and a threshold level of transport blocks scheduled in the uplink are power limited. At step 508, if the determinations from step 507, during time period T2, do not indicate both a distribution of SINR values is below a threshold level and a threshold level of transport blocks scheduled in the uplink are power limited (e.g., a variable "DEC" may be set to a value of 0), then the process may end at step 523. Optionally, at the conclusion of a repeat of step 508, and prior to ending at step 523, the $P_{0\_PUSCH}$ value may be returned to the value it was immediately prior to the last decrease of the $P_{0\_PUSCH}$ value.

At step 509, the $P_{0\_PUSCH}$ value may be decreased, such as to prevent call connection failures or conserve energy. For example, if multiple wireless devices attempt to connect to a source cell at the same time, the noise floor may increase and each wireless device increases its transmission power in order to reach the network device, which in turn, may further increase the noise floor. Ultimately, wireless devices may not be allowed to transmit above a maximum power level (e.g., $P_{CMAX}$), and as a result of a high noise floor wireless devices may not be able to connect to the network device. To avoid this scenario of wireless devices being unable to reach the network device, the $P_{0\_PUSCH}$ value may be decreased, iteratively and by a small amount (e.g., 1, 2, or 3 dB), until it may be determined that either a threshold range of transport blocks are not power limited (e.g., wireless devices are not competing with one another to reach the network device such that the noise floor may be being raised to an unacceptable level) or PUSCH transmissions are below a threshold SINR.

Returning to step 510-A, in FIG. 5B, this step may be performed as part of determining whether to increase the $P_{0\_PUSCH}$ value. Step 510-A may occur if either, at step 503 (in FIG. 5A), mPwr_PUSCH is not less than $P_{0\_PUSCH}$ (e.g., "No" path from step 503 and label "A" connecting FIG. 5A to FIG. 5B), or, if the determinations from steps 504 and 505 indicate, during time period T1, either an unsuccessful allocation for the MCS, an insufficient uplink PRB utilization, or both, (e.g., "No" path from step 505 and label "A" connecting FIG. 5A to FIG. 5B). At or before step 510-A, mPwr_PUSCH may be added to a first user or vendor defined threshold ("VDT"), which may be the same as or different from the VDT in step 506, to yield a sum that may be referred to as "Rp0Nominal." Rp0Nominal may be set to this sum of mPwr_PUSCH plus VDT at step 510-B. Alternatively, Rp0Nominal may be set to this sum prior to or during step 510-A. This sum may be compared with a second threshold (referenced as "UDT"). The UDT may be specific to a particular wireless device, or may be equal to or within a certain value of a maximum allowable transmission power (e.g., $P_{CMAX}$). As an example, the UDT may be a user defined threshold, such as less than −96, −98, or −100 dBm, or any other value or range of values, above which a wireless device will not increase its transmission power. If the sum of mPwr_PUSCH and VDT (e.g., −110 dBm+3 dBM=−107 dBm) is less than UDT (e.g., −96, −98, or −100), then that sum may be set as a nominal value, "Rp0Nominal" (e.g., at step 510-B), and the process may continue to step 511. If the sum of mPwr_PUSCH and VDT (e.g., −107 dBm) is not less than UDT (e.g., −107, −108, or −110 dBm), then the process may continue to step 516. Ultimately, step 510-A may be an initial step for determining whether mPwr_PUSCH may be a high enough value such that the $P_{0\_PUSCH}$ value should not be increased and instead an uplink interference alarm should be generated (e.g., at step 522, discussed below), e.g., by taking into account user defined threshold and vendor defined thresholds. This comparison of the mPwr_PUSCH and VDT sum with UDT in step 510-A also may assist in determining whether the $P_{0\_PUSCH}$ value should be considered for a decrease (e.g., via "Yes" paths from steps 510-A and 511, and label "B" connecting FIG. 5B to FIG. 5A) or an increase (e.g., via "No" path from step 511 or "Yes" path from step 516).

At step 511, the value of Rp0Nominal may be compared with the value of Cp0Nominal determined from step 502 (in FIG. 5A). If Rp0Nominal is less than or equal to Cp0Nominal, then the process may continue to step 512 (via label "B" connecting FIG. 5B to FIG. 5A), in which the $P_{0\_PUSCH}$ value may be set to the value of Rp0Nominal and processes of step 507 (described above regarding FIG. 5A) are performed to determine whether the $P_{0\_PUSCH}$ value should be decreased or remain the same. If Rp0Nominal is greater than Cp0Nominal, then the process may continue at step 513, e.g., for further determinations as to whether the $P_{0\_PUSCH}$ value should be increased.

Step 513 may include setting a first placeholder variable as the current $P_{0\_PUSCH}$ value (e.g., shown in step 513 as "old"), and then setting a second placeholder variable (e.g., shown as "Z" in step 513) as the current $P_{0\_PUSCH}$ value plus an incremental amount (e.g., shown as "Y" in step 513). As an example, the incremental amount Y may be a value such as 1, 2, or 3 dBm, or any other value. Subsequent processes may determine whether the increased value (e.g., Z) should be used for the $P_{0\_PUSCH}$ value, whether the increased value should be increased further (e.g., by an additional Y amount), or whether the prior $P_{0\_PUSCH}$ value should be maintained. After step 513, the process may continue to step 514.

At step 514, the second placeholder variable (e.g., Z in step 513) may be compared with UDT and may also be compared with mPwr_PUSCH. If the second placeholder variable (e.g., Z) is both less than UDT and greater than mPwr_PUSCH, then the $P_{0\_PUSCH}$ may be set to the first placeholder variable (e.g., "old"), at step 521, and the process may continue to step 518. If the second placeholder variable (e.g., Z) is either not less than UDT or not greater than mPwr_PUSCH, then the $P_{0\_PUSCH}$ value may be reset to the prior $P_{0\_PUSCH}$ value (e.g., "old"), at step 515, and the process may end at step 523.

Returning to step 510-A, if the sum of mPwr_PUSCH and VDT is not less than UDT, then the process may continue to step 516. At step 516, mPwr_PUSCH may be compared with a user defined threshold UDT that may be the same as or different from the UDT in step 510-A. If mPwr_PUSCH is less than the UDT value, then the $P_{0\_PUSCH}$ value may be set to mPwr_PUSCH, at step 517, and the process continues to step 518. If mPwr_PUSCH is not less than the UDT value, then one or more uplink ("UL") interference alarms may be generated, at step 522, and the process may end at step 523. The one or more UL interference alarms may include a transmission to a network center indicating changes, e.g., other than incremental adjustments to the $P_{0\_PUSCH}$ value, that may be necessary to improve system performance. By using one or more UL interference alarms in the dynamic power control described herein, a sleeping cell scenario may be avoided, whereby a UL alarm may indicate a network must be further analyzed to determine one or more causes of interference prior to the noise floor rising to the point where wireless devices in a cell may no longer communicate with the network device for that cell (e.g., if the noise floor rises above the wireless device maximum allowable transmission power).

At step 518, during a time interval (e.g., T2), a network device may monitor historical statistics if a $P_{0\_PUSCH}$ value is adjusted. As an example, this time interval could be 5, 10, or 15 to 30 minutes, or on the order of seconds, or more than 30 or less than 5 minutes, or 1 or more hours or any other suitable interval. In particular, during step 518, the performance of a source cell may be monitored and the uplink performance ("ULP") of neighboring cells may be analyzed, e.g., to determine whether degradation occurs in ULP of neighboring cells if a $P_{0\_PUSCH}$ value is changed in the source cell. For example, it may be determined whether degradation occurs in ULP of neighboring cells with respect to the source cell. Degradation in ULP of neighboring cells may be determined based on one or more measurements, including, e.g., average uplink throughput, UL acknowledgment to negative acknowledgement rate ("UL Ack/Nack Rate"), handover drops, a ratio of power limited transport blocks to total transport blocks (e.g., APMeasTbsPwrRestricted Rate), SINR values calculated for PUSCH (e.g., APSinrPuschDistr, or a distribution of the SINR values in certain probability distribution function ("PDF") ranges), measured power of a PRB increase (e.g., mPwr_PUSCH increase), UL PRB pair utilization on the PUSCH (e.g., APPRBUtilUl, or a distribution that shows the total number of used PRB pairs by available PRB pairs on the PUSCH), and/or an indication of UL scheduling (e.g., successful UL scheduling count) before and/or after a change in the $P_{0\_PUSCH}$ value. In addition, it may be determined whether degradation or no change occurs in performance of the source cell. If both of the above determinations occur (e.g., degradation in ULP of neighboring cells with respect to the source cell, and degradation or no change in performance of the source cell), then a variable "INC" may be set to a value of "0," and, at step 519, the process may be determined to end at step 523, without increasing the $P_{0\_PUSCH}$ value. If, however, either or both of the above two determinations do not occur, then the variable "INC" may be set to a value of "1," and the process proceeds to step 520, at which point the $P_{0\_PUSCH}$ value may be increased (e.g., by 1, 2, or 3 dBm, or any other value) and step 513 may be repeated to determine whether the $P_{0\_PUSCH}$ value should be increased further.

During a repeat of step 518, if occurring (e.g., based on a "Yes" result from step 514), T2 may include the same or different duration as T2 from the prior step 518, and measurements may be for the time period occurring after the increase of the $P_{0\_PUSCH}$ value at step 520. In this iterative process, the $P_{0\_PUSCH}$ value may be increased gradually, while the impact of the increase may be assessed relative to whether degradation in ULP of neighboring cells occurs with respect to the source cell and/or whether degradation or no change occurs in the performance of the source cell. For example, if after a period T2 during which the transmission power has been at an increased level, call connection rates do not increase, then the transmission power may be increased by another step (e.g., 1, 2, or 3 dBm, or another amount), before repeating the performance tests of step 518. If, however, call connection rates increase, then it may be determined whether any further increases should be attempted or whether the transmission power should be set to the previously increased level. Ultimately, if both degradation in ULP of neighboring cells with respect to the source cell and degradation, or no change, in performance of the source cell occurs even after an increase in the $P_{0\_PUSCH}$ value, it is determined, at step 519, that no further adjustments to the $P_{0\_PUSCH}$ value should be made and the process may end at step 523. Optionally, at the conclusion of a repeat of step 519, and prior to ending at step 523, the $P_{0\_PUSCH}$ value may be returned to the value it was immediately prior to the last increase of the $P_{0\_PUSCH}$ value.

Figure 6A:
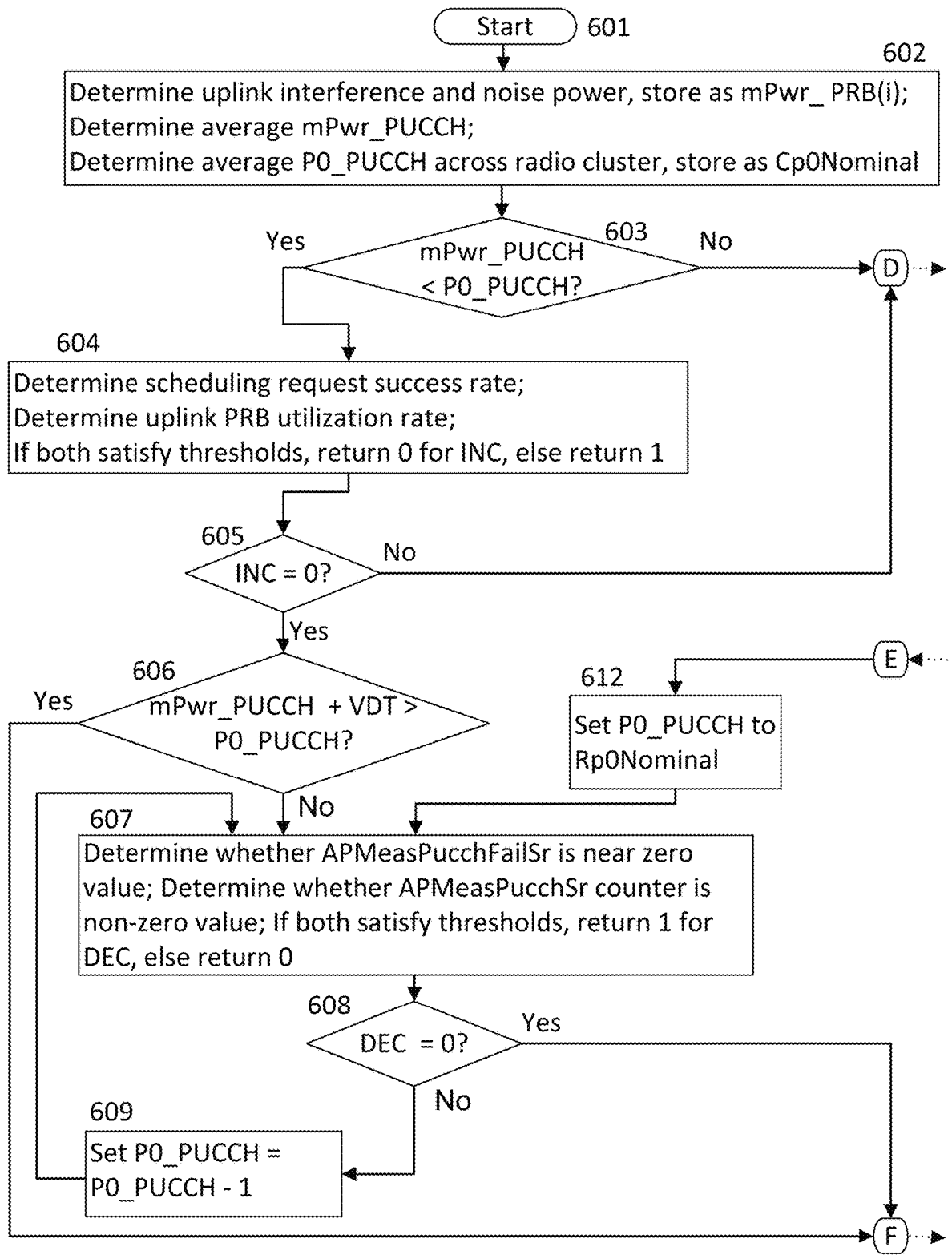
FIG. 6A and FIG. 6B are a flowchart summarizing example processes, in addition to or in the alternative to those in FIGS. 3B and 4, for dynamic uplink power control of PUCCH transmissions.
Figure 6B:
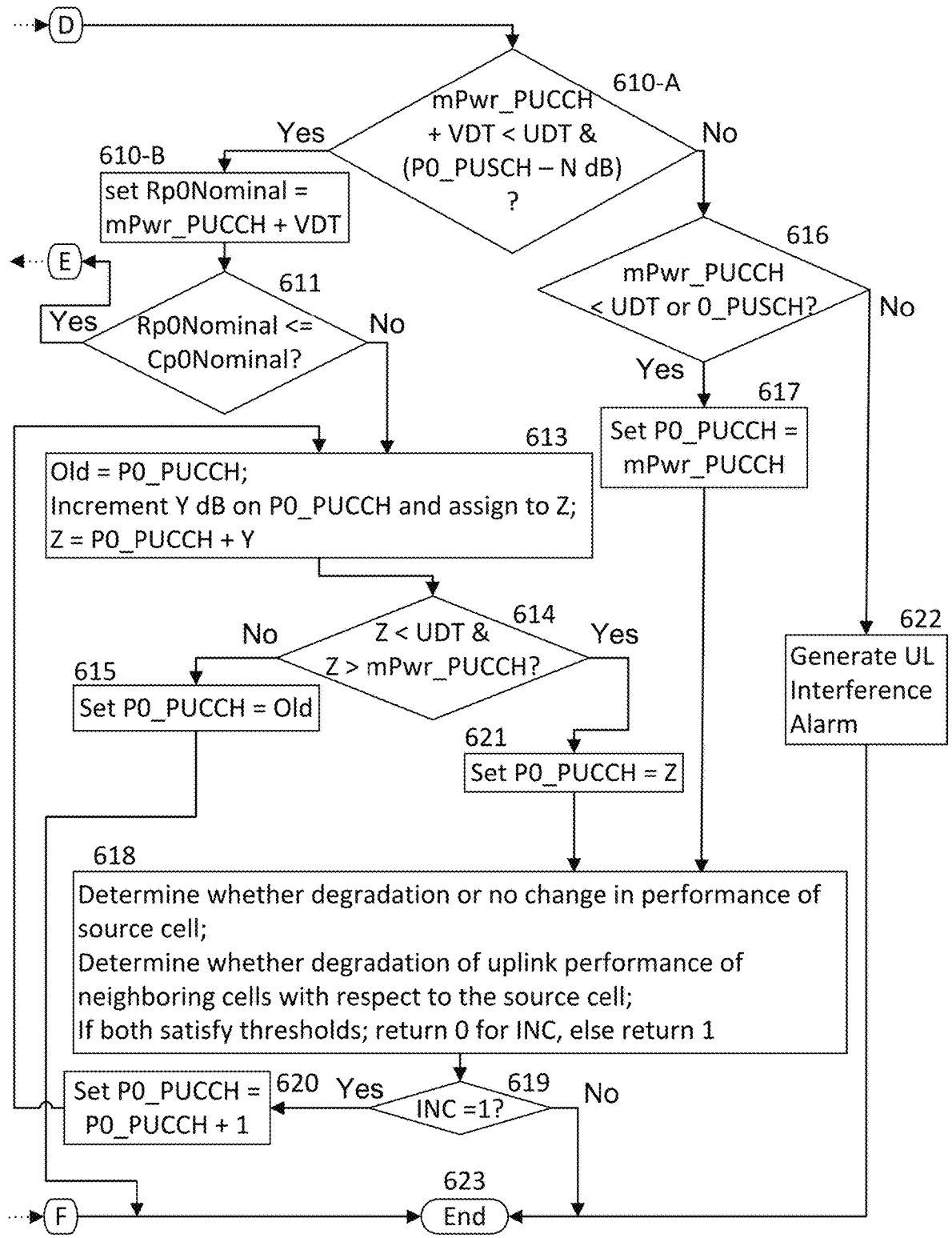

FIG. 6A and FIG. 6B show an example of a process for determining a $P_{0\_PUCCH}$ value, and in particular, whether and to what extent it may be decreased, increased, or remain unchanged. The process described below with respect to FIG. 6A and FIG. 6B may be implemented in the network 100 described above regarding FIG. 1, by device 200 described above regarding FIG. 2, and/or using channels 123-125 described above regarding FIG. 1B. Additionally or alternatively, this process may be performed by any one or more elements of the system 300 described above regarding FIG. 3A. Any portion of this process may also be performed in addition to or in the alternative to any portion of the processes described above regarding FIG. 3B, FIG. 4, FIG. 5A, and FIG. 5B. The process described above with respect to steps 501-523 in FIG. 5A and FIG. 5B for determining a $P_{0\_PUSCH}$ value may generally correspond to steps 601-623, respectively, for determining a $P_{0\_PUCCH}$ value in FIG. 6A and FIG. 6B, except as noted below. Accordingly, with the below exceptions, the above description regarding steps 501-523 for determining a $P_{0\_PUSCH}$ value may apply to steps 601-623 below for determining a $P_{0\_PUCCH}$ value.

PUCCH is a controlled region that may be monitored. Because the controlled region is for an uplink to send feedback for downlink transmissions (e.g., ACK and NACK communications), PUCCH usage may vary. The process described with respect to FIG. 6A and FIG. 6B may include determining whether PUCCH is in a different zone for different cells and determining how PUCCH and cells are coupled.

In addition, PUCCH transmissions may use an MCS that differs from PUSCH transmissions, which may require use of different thresholds such as a different VDT and/or a different UDT. For example, PUCCH transmissions may use a QPSK (or 4-QAM) or binary phase shift keying (BPSK) MCS, whereas PUSCH transmissions may use a 64-QAM or 16-QAM MCS, or a higher MCS such as 128-QAM or 256-QAM.

The process may begin at step 601 in FIG. 6A, such as if a wireless device enters a cell area or at any other time, to determine a new $P_{0\_PUCCH}$ value for uplink transmission power of a wireless device. At or before step 601, a network device may have an initial $P_{0\_PUCCH}$ value, which may be referred to as "$P_{0\_PUCCH}$".

At step 602, a device such as a network device may determine received interference and noise power on a PUCCH channel on a per physical resource block basis on all receive ports of the device during a "no allocation" time period in the uplink. This received interference and noise power may be determined, stored, and/or designated as mPwr_PRB(i) for PUCCH transmissions in the same manner described above regarding mPwr_PRB(i) for PUSCH transmissions and step 502 of FIG. 5A, incorporated by reference here. Separate designations for mPwr_PRB may be used for PUCCH and PUSCH transmissions, respectively. For example, an average power of PUCCH transmissions across an RC may be measured and/or stored as "mPwr_PUCCH." As above regarding step 502, in a 20 MHz system having one-hundred PRBs, an average mPwr_PUCCH corresponds to an average value of mPwr_PRB(0) through mPwr_PRB(99). Also, an average $P_{0\_PUCCH}$ value across an RC may be determined and/or stored as "Cp0Nominal." Each network device may communicate with other network devices of the RC, e.g., via an X2 or a Self-Optimized Network ("SON"), to provide values for mPwr_PRB(i) and mPwr_PUCCH across the RC.

The received noise and interference power on a PUCCH channel determined in step 602 may correspond with a PDF shown below in Table 4:

TABLE 4

| | |
|---|---|
| [0]: | N + I <= −121 |
| [1]: | −121 < N + I <= −120 |
| [2]: | −120 < N + I <= −119 |
| [3]: | −119 < N + I <= −118 |
| [4]: | −118 < N + I <= −117 |
| [5]: | −117 < N + I <= −116 |
| [6]: | −116 < N + I <= −115 |
| [7]: | −115 < N + I <= −114 |
| [8]: | −114 < N + I <= −113 |
| [9]: | −113 < N + I <= −112 |
| [10]: | −112 < N + I <= −108 |
| [11]: | −108 < N + I <= −104 |
| [12]: | −104 < N + I <= −100 |
| [13]: | −100 < N + I <= −96 |
| [14]: | −96 < N + I <= −92 |
| [15]: | −92 < N + I |

In Table 4 above, the PDF includes sixteen levels, PDF[0] to PDF[15], where "N+I" corresponds to received noise ("N") and interference ("I") power on a PUCCH channel. The values in Table 4 correspond to units of dBm per PRB. For received noise and interference power measurements, a wideband value for the frequency domain may be measured in each valid uplink subframe. One or more counters for the PDF ranges may be reset after a measurement period that may be any period of time, such as T1 or T2 described below. The measured received noise and interference power for a PUCCH channel may be referred to as "APMeasRecInterferencePowrPucch." In addition, accumulated interference power for each of "i" PRB(i) (e.g., PRB(0) to PRB(99)) may be determined, and may be referred to as "APMeasRecInterferencePowrPrb(i)." The accumulated interference power for each PRB may be measured by units of 1 mW*$2^{-22}$, and samples may be summed over a measurement period that may be any period of time, such as T1 or T2 described below. These samples may also be averaged over receive antennas (e.g., for all wireless devices across cells of a Radio Cluster), and the samples may be measured for each PRB per each 100 ms. One or more counters may be used for the PRB interference power measurements and may be reset after a measurement period that may be any period of time, such as T1 or T2 described below.

At Step 603, the value mPwr_PUCCH determined at step 602 may be compared with $P_{0\_PUCCH}$ for a device such as a network device. If mPwr_PUCCH is less than $P_{0\_PUCCH}$, then the process continues at step 604 via the "Yes" path, which includes considerations for whether to decrease the $P_{0\_PUCCH}$ value. For example, if the average power of PUCCH transmissions across the RC is (e.g., −108 dBm) less than the $P_{0\_PUCCH}$ value for a network device (e.g., −106 dBm), it may be an indication that the $P_{0\_PUCCH}$ value should be decreased. If mPwr_PUCCH is not less than the $P_{0\_PUCCH}$ value, then the process continues at step 610-A via the "No" path and label "D" connecting FIG. 6A to FIG. 6B, which includes considerations for whether to increase the $P_{0\_PUCCH}$ value. For example, if the average power of PUCCH transmissions across the RC is (e.g., a $P_{0\_PUCCH}$ value of −108 dBm) greater than or equal to the average PUCCH transmission power for a network device (e.g., a $P_{0\_PUCCH}$ value of −110 dBm), it may be an indication that the $P_{0\_PUCCH}$ value should be increased. While the result of step 603 may be an indication of whether the $P_{0\_PUCCH}$ value should be decreased or increased, it may not necessarily be determinative of either outcome. For example, as discussed below, a result of step 605 may be an indication that the $P_{0\_PUCCH}$ value should be considered for an increase rather than a decrease (e.g., via label "D" connecting FIG. 6A to FIG. 6B), and a result of step 611 (described below regarding FIG. 6B) may be an indication that the $P_{0\_PUCCH}$ value should be considered for a decrease rather than an increase (e.g., via label "E" connecting FIG. 6B to FIG. 6A).

At step 604, determinations are made as to a Scheduling Request ("SR") success rate during a particular time period and with at least a minimum uplink PRB utilization. For example, if SRs from wireless devices in a cell are received by a network device in that cell via a PUCCH channel 100% successfully, or within a threshold level of success (e.g., 98%, 95%, 92%, 90%, 88%, 85%, or another % success rate), it may be determined whether uplink transmission power may be reduced while maintaining such an SR success rate, and if so, what may be the maximum power level decrease that achieved it (e.g., via the "Yes" path from step 605 discussed below). Similarly, if SRs are not 100% successful, or are not within a threshold level of success (e.g., 98%, 95%, 92%, 90%, 88%, 85%, or another % success rate), it may be determined whether an increase in uplink transmission power may achieve the SR success rate and, if so, what may be the minimum power level increase that achieves it (e.g., via the "No" path from step 605 discussed below).

An SR success rate may be determined as follows. During a time period (e.g., T1, described below), measures (e.g., total numbers) of received SRs on a PUCCH channel (e.g., "APMeasPucchSr") and failures of SRs over the PUCCH channel may be determined (e.g., "APMeasPucchFailSr"). SR failures may be based on a number of received SRs over RACH, whereby an SR may be transmitted over RACH if a failure of an SR transmission by a wireless device to a network device over PUCCH occurs. Also, an SR failure count may be increased each time a Message 3 (e.g., "raMsg3," or a message acknowledging a Random Access Response) is received from a wireless device that has SR resources on PUCCH and is in sync. The SR failure count and the number of SRs successfully received over the PUCCH channel may be reset after a time period (e.g., T1, described below). As an example, an SR success rate may be determined as follows:

*SR* success rate=1−[APMeasPucchFailSr/(APMeasPucchFailSr+APMeasPucchSr)]

The SR success rate may be determined by a wireless device, a network device, and/or another device in a network (e.g., any device in network 300). The wireless device may transmit the SR success rate and/or related information to a device such as a network device, which may further transmit to additional devices in the network described above with respect to FIG. 3A, for use in dynamically determining uplink transmission power.

In addition, at step 604, it may be determined whether uplink PRB utilization satisfies a threshold. For example, satisfying a threshold may be being equal to or greater than a minimum uplink PRB utilization rate, such as 1%, 2%, 5%, 10%, or any other percentage sufficient to represent operating conditions in a network. If uplink PRB utilization rate does not satisfy the threshold, then there may be insufficient data to determine whether uplink transmission power may be decreased while maintaining a threshold level of successful call connections, and the process may return to determining whether to increase or maintain the current uplink transmission power (e.g., via the "No" path from step 605 discussed below). For example, if ten wireless devices are in a cell and only one of the wireless devices has attempted and succeeded transmitting a Scheduling Request, then that single SR could result in a satisfactory SR success rate (e.g., 100%). However, a single SR success by one wireless device may not be indicative of a need to decrease uplink power for all wireless devices in the cell if that cell may be experiencing a relatively low uplink PRB utilization rate (e.g., less than 95% or 90%). If the other nine wireless devices in the cell ultimately attempt a SR, they may not experience the same success as the first attempt by the first wireless device. And the likelihood that the other nine wireless devices experience an SR failure may increase if uplink power is reduced based on that single SR success. By requiring a threshold level of uplink PRB utilization in combination with a satisfactory SR success rate, the success of a single wireless device or of a small number of wireless devices (e.g., two or three wireless devices) may be less likely to result in an unnecessary or undesirable decrease in uplink power.

As another example, consider a cell in which there are three wireless devices, with one of the wireless devices close and connected to the network device and two of the wireless devices far away from and not connected to the network device. In this example, the uplink PRB utilization rate may be relatively low (e.g., less than 95% or 90%), due to the two wireless devices that are far away from the network device. Those two wireless devices could be causing interference for the network device while not utilizing uplink PRBs and not SR failures. In such a scenario, it may be more likely that an increase (e.g., via the "No" path from step 605), and not a decrease (e.g., via the "Yes" path from step 605), in uplink power would improve performance in the cell by enabling the two far away wireless devices to utilize uplink PRBs. As in the previous example, by requiring a threshold level of uplink PRB utilization, in combination with a satisfactory SR success rate, interference caused by wireless devices that are not utilizing PRBs may be less likely to result in an unnecessary or undesirable decrease in uplink power.

Any modulation and coding scheme may be used for uplink transmissions, such as 16-Quadrature Amplitude Modulation ("16-QAM"), Quadrature Phase Shift Keying ("QPSK" or 4-QAM), or a higher or lower n level of n-QAM. Each MCS may have a respective threshold for successful uplink allocations. For example, during the particular time period, each successful SR may be added and compared with the number of SRs that failed. For each PRB of a cell of a network device, a determination may be made as to whether a utilization of that resource may be above a predetermined minimal value, such as 1%, 5%, 10%, or 15%. If a minimum threshold of PRB utilization is not reached, then measurements may not be indicative of typical operating conditions, and uplink transmission power adjustments in response to the measurements may not have a desired or expected result, such as improving SR success rate and/or increasing bandwidth.

The time period for determinations in this step 604 may be referred to as T1, which may be the same as or different from the T1 referred to above regarding step 504 in FIG. 5A. In step 604, during time T1, a network device may monitor historical statistics for a $P_{0\_PUCCH}$ value. As an example, this time interval could be from 5 minutes to 10, 15, 20, 25, or 30 minutes. T1 could also be on the order of seconds, less than 5 minutes, or more than 30 minutes. T1 could also be on the order of hours, days, weeks, or months, although a shorter time frame may provide faster responsiveness to network conditions. Time interval T1 may also be adjusted, e.g., depending on the resulting KPI parameters and any preferred ranges of values for the parameters. While time periods are included as examples, any of the processes shown and described with respect to FIG. 6A and FIG. 6B, including step 604, may be performed at any time, including simultaneously, near simultaneously, in real-time, near real-time, or over any duration of time.

At step 605, if the determinations from step 604 indicate, during time period T1, a satisfactory SR success rate for the MCS with a sufficient uplink PRB utilization, then the process may continue to step 606 (e.g., a variable "INC" may be set to a value of "0"), for further determinations whether to decrease the $P_{0\_PUCCH}$ value. At step 605, if the determinations from step 605 indicate, during time period T1, either an unsatisfactory SR success rate for the MCS, an insufficient uplink PRB utilization, or both, then the process may continue to step 610-A (e.g., the variable "INC" may be set to a value of "1") via label "D" connecting FIG. 6A to FIG. 6B, for further determinations whether to increase the $P_{0\_PUCCH}$ value. Similar to step 603, while the result of steps 604 and 605 may be an indication of whether the $P_{0\_PUCCH}$ value should be decreased or increased, it may not necessarily be determinative of either outcome. For example, as discussed below, a result of step 606 may be an indication that the $P_{0\_PUCCH}$ value should not be changed (e.g., via the "Yes" path and label "F" connecting FIG. 6A to FIG. 6B), and a result of step 611 (in FIG. 6B) may be an indication that the $P_{0\_PUCCH}$ value should be considered for a decrease rather than an increase (e.g., via the "No" path and label "B" connecting FIG. 6B to FIG. 6A).

At step 606, a user or vendor defined threshold ("VDT") may be added to the value mPwr_PUCCH determined at step 602 and that sum may be compared with $P_{0\_PUCCH}$ for a network device. The VDT may be any threshold value and may vary depending on the MCS used and any SINR requirement or other network parameters. The VDT in step 606 may be the same as or different from the VDT in step 506 of FIG. 5A. As an example, in step 606, the VDT may be 3 dBm from a SINR requirement. The VDT may be any other value, and additional examples include but are not limited to +/−1, 2, 3, 4, 5, 10, 12, 16, 18, 20, 22, or 25 dBm. The VDT may vary, e.g., depending upon receiver sensitivity of hardware in use that may be designed and manufactured by different vendors. Due to these differences, establishing a VDT may ensure that a wireless device transmission power may be maintained above a noise floor. If the sum of mPwr_PUCCH and VDT is not greater than $P_{0\_PUCCH}$, then the process continues at step 607 via the "No" path, which includes considerations for whether to decrease the $P_{0\_PUCCH}$ value. For example, if the average power of PUCCH transmissions across the RC added to VDT yields a sum (e.g., −108 dBm) that is not greater than the $P_{0\_PUCCH}$ value for a network device (e.g., −106 dBm), it may be an indication that the $P_{0\_PUCCH}$ value should be decreased. If the sum of mPwr_PUCCH and VDT is greater than $P_{0\_PUCCH}$, then the process ends at step 623 via the "Yes" path and label "F" connecting FIG. 6A to FIG. 6B, wherein a determination may be made not to decrease the $P_{0\_PUCCH}$ value and the $P_{0\_PUCCH}$ value remains unchanged. By proceeding to step 623 (in FIG. 6B), the process determines that the $P_{0\_PUCCH}$ value may be already set to an acceptable value. For example, if the average power of PUCCH transmissions across the RC plus VDT (e.g., −100 dBm) is greater than the $P_{0\_PUCCH}$ value (e.g., −110 dBm), and the average power of PUCCH transmissions across the RC is less than $P_{0\_PUCCH}$ (e.g., determined at step 603), it may be an indication that the $P_{0\_PUCCH}$ may be already at a satisfactory level and need not be decreased or increased at that time.

At step 607, determinations may be made as to whether, during a particular time period (e.g., T2, described below), a measure of Scheduling Request failures is zero or near zero (e.g., 1, 2, or 3 failed SR requests) and a measure of successful SRs is non-zero or above near zero (e.g., more than 1, 2, or 3 successful SRs). Optionally, step 607 may be skipped after step 606 and performed only after step 609 (described below).

As an example, during step 607, it may be determined how many PUCCH Scheduling Request slots are present at a particular time for wireless devices connected to a network device, and what portion of the time each wireless device uses the PUCCH. Counters (e.g., referred to above as "APMeasPucchSr" and "APMeasPucchFailSr") may measure a number of successful SRs and SR failures, such as described above regarding step 604. Step 607 may perform some or all of the procedures described above regarding step 604, or alternatively, use information determined from step 604 for determinations in step 607.

The time period for determinations in step 607 may be referred to as T2. T2 in step 607 may be the same as or different from T2 in step 507 of FIG. 5A. In step 607, during time T2, a network device may determine measures of SR failures and successful SRs, such as described above regarding step 604, including for a period of time after which a value of $P_{0\_PUCCH}$ may have changed from an initial $P_{0\_PUCCH}$ value. As an example, this time interval could be from 5 minutes to 10, 15, 20, 25, or 30 minutes. T2 could also be on the order of seconds, less than 5 minutes, or more than 30 minutes. T2 could also be on the order of hours, days, weeks, or months, although a shorter time frame may provide faster responsiveness to network conditions. Also, T2 may be less than T1 (addressed above regarding step 604) such that data may be analyzed during T1 over an extended period of time whereas analysis during T2 may be limited to a period after a prior change in a $P_{0\_PUCCH}$ value or after a prior determination of whether to change a $P_{0\_PUCCH}$ value has occurred.

At step 608, if the determinations from step 607 indicate, during time period T2, a measure of Scheduling Request failures is zero or near zero (e.g., 1, 2, or 3 failed SR requests) and a measure of successful SRs is non-zero or above near zero (e.g., more than 1, 2, or 3 successful SRs), then the process may continue to step 609 (e.g., a variable "DEC" may be set to a value of 1), at which point the $P_{0\_PUCCH}$ value may be decreased (e.g., by 1, 2, or 3 dBm, or any other value) and step 607 may be repeated to determine whether the $P_{0\_PUCCH}$ value should be decreased further. During a repeat of step 607, T2 may include the same or different duration as T2 from the prior step 607, and measurements may be for the time period occurring after the decrease of the $P_{0\_PUCCH}$ value at step 609. In this iterative process, the $P_{0\_PUCCH}$ value may be decreased gradually, while the impact of a decrease may be assessed relative to whether a measure of Scheduling Request failures is zero or near zero (e.g., 1, 2, or 3 failed SR requests) and a measure of successful SRs is non-zero or above near zero (e.g., more than 1, 2, or 3 successful SRs). At step 608, if the determinations from step 607, during time period T2, do not indicate both a measure of Scheduling Request failures is zero or near zero and a measure of successful SRs is non-zero or above near zero (e.g., a variable "DEC" may be set to a value of 0), then the process may end at step 623. Optionally, at the conclusion of a repeat of step 608, and prior to ending at step 623, the $P_{0\_PUCCH}$ value may be returned to the value it was immediately prior to the last decrease of the $P_{0\_PUCCH}$ value.

At step 609, the $P_{0\_PUCCH}$ value may be decreased, such as to prevent SR failures or conserve energy. For example, if multiple wireless devices transmit an SR at the same time, the noise floor may increase and each wireless device increases its transmission power in order to reach the network device, which in turn, may further increase the noise floor. Ultimately, wireless devices may not be allowed to transmit above a maximum power level (e.g., $P_{CMAX}$), and as a result of a high noise floor wireless devices may not be able to connect to the network device. To avoid this scenario of wireless devices being unable to reach the network device, the $P_{0\_PUCCH}$ value may be decreased, iteratively and by a small amount (e.g., 1, 2, or 3 dB), until it may be determined that either a measure of Scheduling Request failures is zero or near zero and a measure of successful SRs is non-zero or above near zero.

Returning to step 610-A in FIG. 6B, this step may be performed as part of determining whether to increase the $P_{0\_PUCCH}$ value. Step 610A may occur if either, at step 603 (in FIG. 6A), mPwr_PUCCH is not less than $P_{0\_PUCCH}$ (e.g., "No" path from step 603 and label "D" connecting FIG. 6A to FIG. 6B), or, if the determinations from steps 604 and 605 indicate, during time period T1, either an unsatisfactory SR success rate, an insufficient uplink PRB utilization, or both, (e.g., "No" path from step 605 and label "D" connecting FIG. 6A to FIG. 6B). At or before step 610-A, mPwr_PUCCH may be added to a first user or vendor defined threshold ("VDT"), which may be the same or different from the VDT in step 606, to yield a sum that may be referred to as "Rp0Nominal." Rp0Nominal may be set to this sum of mPwr_PUCCH plus VDT at step 610-B. Alternatively, Rp0Nominal may be set to this sum prior to or during step 610-A. This sum may be compared with a second threshold (referenced as "UDT"). The UDT may be specific to a particular wireless device, or may be equal to or within a certain value of a maximum allowable transmission power (e.g., $P_{CMAX}$). As an example, the UDT may be a user defined threshold, such as less than −96, −98, or −100 dBm, or any other value or range of values, above which a wireless device will not increase its transmission power. In addition, at step 610, the above sum may be compared with the $P_{0\_PUSCH}$ value reduced by a threshold level of noise (e.g., "N") which may be, e.g., from 5 dBm to 12 dBm, or any other threshold value. If the sum of mPwr_PUCCH and VDT (e.g., −110 dBm+3 dBM=−107 dBm) is less than UDT (e.g., −96, −98, or −100 dBm) and is less than the $P_{0\_PUSCH}$ value reduced by N (e.g., −96, −98, or −100 dBm), then that sum may be set as a nominal value, "Rp0Nominal" (e.g., at step 610-B), and the process may continue to step 611. If the sum of mPwr_PUCCH and VDT (e.g., −107 dBm) is not less than UDT (e.g., −107, −108, or −110 dBm) or is not less than the $P_{0\_PUSCH}$ value reduced by N (e.g., −107, −108, or −110 dBm), then the process may continue to step 616. Ultimately, step 610-A may be an initial step for determining whether mPwr_PUCCH is a high enough value such that the $P_{0\_PUCCH}$ value should not be increased and instead an uplink interference alarm should be generated (e.g., at step 622, discussed below). This comparison of the mPwr_PUCCH and VDT sum with UDT and the $P_{0\_PUSCH}$ value reduced by N in step 610-A also may assist in determining whether the $P_{0\_PUCCH}$ value should be considered for a decrease (e.g., via "Yes" paths from steps 610-A and 611, and label "E" connecting FIG. 6B to FIG. 6A) or an increase (e.g., via "No" path from step 611 or "Yes" path from step 616).

At step 611, the value of Rp0Nominal may be compared with the value of Cp0Nominal determined from step 602 (in FIG. 6A). If Rp0Nominal is less than or equal to Cp0Nominal, then the process may continue to step 612 (via label "E" connecting FIG. 6B to FIG. 6A), in which the $P_{0\_PUCCH}$ value may be set to the value of Rp0Nominal and processes of step 607 (described above regarding FIG. 6A) are performed to determine whether the $P_{0\_PUCCH}$ value should be decreased or remain the same. If Rp0Nominal is greater than Cp0Nominal, then the process may continue at step 613, e.g., for further determinations as to whether the $P_{0\_PUCCH}$ value should be increased.

Step 613 may include setting a first placeholder variable as the current $P_{0\_PUCCH}$ value (e.g., shown in step 613 as "old"), and then setting a second placeholder variable (e.g., shown as "Z" in step 613) as the current $P_{0\_PUCCH}$ value plus an incremental amount (e.g., shown as "Y" in step 613). As an example, the incremental amount Y may be a value such as 1, 2, or 3 dBm, or any other value. Subsequent processes may determine whether the increased value (e.g., Z) should be used for the $P_{0\_PUCCH}$ value, whether the increased value should be increased further (e.g., by an additional Y amount), or whether the prior $P_{0\_PUCCH}$ value should be maintained. After step 613, the process may continue to step 614.

At step 614, the second placeholder variable (e.g., Z in step 613) may be compared with UDT and may also be compared with mPwr_PUCCH. If the second placeholder variable (e.g., Z) is both less than UDT and greater than mPwr_PUCCH, then the $P_{0\_PUCCH}$ may be set to the first placeholder variable (e.g., "old"), at step 621, and the process may continue to step 618. If the second placeholder variable (e.g., Z) is either not less than UDT or not greater than mPwr_PUCCH, then the $P_{0\_PUCCH}$ value may be reset to the prior $P_{0\_PUCCH}$ value (e.g., "old"), at step 615, and the process may end at step 623.

Returning to step 610-A, if the sum of mPwr_PUCCH and VDT is not less than UDT or is not less than the $P_{0\_PUSCH}$ value reduced by N, then the process may continue to step 616. At step 616, mPwr_PUSCH may be compared with a user defined threshold UDT, that may be the same as or different from the UDT in step 610-A, and mPwr_PUSCH may be compared with the $P_{0\_PUSCH}$ value. If mPwr_PUSCH is less than the UDT value or is less than the $P_{0\_PUSCH}$ value, then the $P_{0\_PUCCH}$ value may be set to mPwr_PUCCH, at step 617, and the process continues to step 618. If mPwr_PUCCH is not less than the UDT value and is not less than the $P_{0\_PUSCH}$ value, then one or more uplink ("UL") interference alarms may be generated, at step 622, and the process may end at step 623. For example, the one or more interference alarms may include an uplink PUCCH interference alarm, such as by an Operating Support System such as OSS 310 or any other device in FIG. 3A. The one or more interference alarms may also include uplink PUCCH versus PUSCH interference alarm, e.g., if PRBs used for PUCCH overlap with PRBs used for PUSCH of a neighboring cell. Such an overlap may result from PUCCH over-dimensioning either in a source cell or in a neighboring cell. The one or more UL interference alarms may include a transmission to a network center indicating changes, e.g., other than incremental adjustments to the $P_{0\_PUCCH}$ value, that may be necessary to improve system performance. By using one or more UL interference alarms in the dynamic power control described herein, a sleeping cell scenario may be avoided, whereby a UL alarm may indicate a network must be further analyzed to determine one or more causes of interference prior to the noise floor rising to the point where wireless devices in a cell may no longer communicate with the network device for that cell (e.g., if the noise floor rises above the wireless device maximum allowable transmission power).

At step 618, during a time interval (e.g., T2), a network device may monitor historical statistics if a $P_{0\_PUCCH}$ value is adjusted. As above, T2 in step 618 may be the same as or different from T2 in step 518 of FIG. 5B. As an example, during step 618, this time interval T2 could be 5, 10, or 15 to 30 minutes, or on the order of seconds, or more than 30 or less than 5 minutes, or 1 or more hours or other suitable time interval. In particular, during step 618, the performance of a source cell may be monitored and the uplink performance ("ULP") of neighboring cells may be analyzed, e.g., to determine whether degradation occurs in ULP of neighboring cells if a $P_{0\_PUCCH}$ value is changed in the source cell. For example, it may be determined whether degradation occurs in ULP of neighboring cells with respect to the source cell. Degradation in ULP of neighboring cells may be determined based on one or more measurements, including, e.g., average uplink throughput, UL acknowledgment to negative acknowledgement rate ("UL Ack/Nack Rate"), a measured power of a PRB increase (e.g., mPwr_PUCCH increase), UL PRB pair utilization on the PUCCH (e.g., APPRBUtilUl, or a distribution that shows the total number of used PRB pairs by available PRB pairs on the PUCCH), and/or an indication of UL scheduling requests (e.g., successful UL scheduling count and rate) before and/or after a change in the $P_{0\_PUCCH}$ value. In addition, it may be determined whether degradation or no change occurs in performance of the source cell. If both of the above determinations occur (e.g., degradation in ULP of neighboring cells with respect to the source cell, and degradation or no change in performance of the source cell), then a variable "INC" may be set to a value of "0," and, at step 619, the process may be determined to end at step 623, without increasing the $P_{0\_PUCCH}$ value. If, however, either or both of the above two determinations do not occur, then the variable "INC" may be set to a value of "1," and the process proceeds to step 620, at which point the $P_{0\_PUCCH}$ value may be increased (e.g., by 1, 2, or, 3 dBm, or any other value) and step 613 may be repeated to determine whether the $P_{0\_PUCCH}$ value should be increased further.

During a repeat of step 618, if occurring (e.g., based on a "Yes" result from step 614), T2 may include the same or different duration as T2 from the prior step 618, and measurements may be for the time period occurring after the increase of the $P_{0\_PUCCH}$ value at step 620. In this iterative process, the $P_{0\_PUCCH}$ value may be increased gradually, while the impact of the increase may be assessed relative to whether degradation in ULP of neighboring cells occurs with respect to the source cell and/or whether degradation or no change occurs in the performance of the source cell. For example, if after a period T2 during which the transmission power has been at an increased level, an SR success rate does not increase, then the transmission power may be increased by another step (e.g., 1, 2, or 3 dBm, or another amount), before repeating the performance tests of step 618. If, however, SR success rates increase, then it may be determined whether any further increases should be attempted or whether the transmission power should be set to the previously increased level. Ultimately, if both degradation in ULP of neighboring cells with respect to the source cell and degradation, or no change, in performance of the source cell occurs even after an increase in the $P_{0\_PUCCH}$ value, it is determined, at step 619, that no further adjustments to the $P_{0\_PUCCH}$ value should be made and the process may end at step 623. Optionally, at the conclusion of a repeat of step 619, and prior to ending at step 623, the $P_{0\_PUCCH}$ value may be returned to the value it was immediately prior to the last increase of the $P_{0\_PUCCH}$ value.

A feedback control mechanism may be included that may account for changes in neighboring cells. For example, if multiple cells in a network increase their respective uplink transmission power levels too high, at the same or similar times, a system could experience overloaded conditions. The noise floor could rise as the uplink transmission power levels of neighboring cells also rise, leading to system call connection failures and decreased KPI values. For example, if $P_{0\_PUSCH}$ and $P_{0\_PUCCH}$ values of a first cell are increased, wireless devices in the first cell may create low-level interference to a neighboring cell. Likewise, increasing $P_{0\_PUSCH}$ and $P_{0\_PUCCH}$ values of a neighboring cell may create low-level interference to the first cell. To avoid the above issues, such as interference, call connection failures, and decreased KPI values, a determination whether to increase the uplink transmission power of a cell may be based on periodic assessments of the performance of neighboring cells, as described above.

Determinations for uplink power control levels may be determined in advance based on predicted network conditions. For example, during peak traffic load, interference from neighboring cells may also be at its peak. To compensate for this inter-cell interference, a power values in a cell may be increased to raise the uplink transmission power level for that cell above the noise floor. Peak traffic load conditions may also be predicted, based on prior performance of a network. For example, traffic loads may follow predictable weekday or weekend patterns, such as increased loads during business hours, decreased load after prime time evening hours (e.g., after 8:00, 9:00, or 10:00 pm EST), and further decreased load to a minimum in early morning hours (e.g., 1:00 to 4:00 am EST). By using predicted loads, a network device in a network may set power values for cells soon before (e.g., 1 minute, 2 minute, 5 minutes, or 10 minutes) an expected traffic load change in the network. Adjusting uplink power control values prior to an eventual occurrence of an increased or decreased traffic load may improve system performance by avoiding inter-cell interference, preventing call connection failures, and other system improvements such as increased KPI values.

Although examples are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this disclosure though not expressly stated herein, and are intended to be within the spirit and scope of the disclosure. Accordingly, the foregoing description is by way of example only, and not limiting. This patent is limited only as defined in the following claims and equivalents thereto.

I claim:

1. A method comprising:
   receiving, from a first device via a first cell, first data associated with first uplink transmissions;
   receiving, from a second device via one or more second cells, second data associated with second uplink transmissions;
   determining, for the first cell and based on the first data and the second data, a first power value comprising one or more of a Physical Uplink Shared Channel (PUSCH) power value or a Physical Uplink Control Channel (PUCCH) power value;
   sending an indication of the first power value;
   receiving, via the first cell, third data associated with third uplink transmissions using a transmission power based on the first power value;
   determining, for the first cell and based on the third data and the second data, a second power value comprising one or more of a PUSCH power value or a PUCCH power value, wherein the second power value is associated with an adjustment of the first power value; and
   sending an indication of the second power value.

2. The method of claim 1, wherein the determining the first power value comprises:
   determining an average power value for the first uplink transmissions and the second uplink transmissions;
   comparing the average power value with an initial power value for the first cell; and
   adjusting, based on the comparing, the initial power value.

3. The method of claim 1, wherein the determining the second power value comprises determining whether an uplink physical resource block utilization rate satisfies a threshold.

4. The method of claim 3, wherein the determining the second power value further comprises:
   determining a call connection success rate;
   determining a signal to interference and noise ratio; and
   determining a success rate for uplink scheduling requests.

5. The method of claim 1, wherein the second power value corresponds to the first power value increased by a predetermined amount.

6. The method of claim 5, further comprising increasing the second power value by the predetermined amount after at least one of:
   determining that an uplink performance for the first cell satisfies a threshold; or
   determining that an uplink performance of the one or more second cells satisfies a threshold.

7. A method comprising:
   sending, by a device via a first cell, first data associated with first uplink transmissions;
   receiving, by the device and for the first cell, a first indication of a first power value comprising one or more of a Physical Uplink Shared Channel (PUSCH) power value or a Physical Uplink Control Channel (PUCCH) power value, wherein the first power value is based on the first data and second data, and wherein the second data is associated with second uplink transmissions via one or more second cells;
   sending, by the device via the first cell, a second indication of the first power value;
   determining third data associated with third uplink transmissions, wherein the third uplink transmissions are transmitted via the first cell using a transmission power based on the first power value;
   receiving a first indication of a second power value for the first cell, wherein the second power value is based on the third data and the second data, and wherein the second power value is associated with an adjustment of the first power value; and
   sending, by the device via the first cell, a second indication of the second power value.

8. The method of claim 7, wherein the first power value is further based on:
   an average power value for the first uplink transmissions and the second uplink transmissions;

a comparison of the average power value with an initial power value for the first cell; and an adjustment, based on the comparison, of the initial power value.

9. The method of claim 7, wherein the second power value is further based on an uplink physical resource block utilization rate.

10. The method of claim 9, wherein the second power value is further based on:
a call connection success rate;
a signal to interference and noise ratio; and
a success rate for uplink scheduling requests.

11. The method of claim 7, wherein the second power value corresponds to the first power value increased by a predetermined amount.

12. The method of claim 11, wherein the second power value is further based on at least one of:
an uplink performance for the first cell satisfying a threshold; or
an uplink performance of the one or more second cells satisfying a threshold.

13. The method of claim 7, wherein:
the first indication of the first power value and the second indication of the first power value are both a same indication of the first power value; and
the first indication of the second power value and the second indication of the second power value are both a same indication of the second power value.

14. A first device comprising:
one or more processors; and
memory storing instructions that, when executed by the one or more processors, cause the first device to:
receive, from a second device via a first cell, first data associated with first uplink transmissions;
receive, from a third device via one or more second cells, second data associated with second uplink transmissions;
determine, for the first cell and based on the first data and the second data, a first power value comprising one or more of a Physical Uplink Shared Channel (PUSCH) power value or a Physical Uplink Control Channel (PUCCH) power value;
send an indication of the first power value;
receive, via the first cell, third data associated with third uplink transmissions using a transmission power based on the first power value;
determine, for the first cell and based on the third data and the second data, a second power value comprising one or more of a PUSCH power value or a PUCCH power value, wherein the second power value is associated with an adjustment of the first power value; and
send an indication of the second power value.

15. The first device of claim 14, wherein the instructions, when executed by the one or more processors, cause the first device to perform the following to determine the first power value:
determine an average power value for the first uplink transmissions and the second uplink transmissions;
compare the average power value with an initial power value for the first cell; and adjust, based on a comparison of the average power value with the initial power value for the first cell, the initial power value.

16. The first device of claim 14, wherein the instructions, when executed by the one or more processors, cause the first device to perform at least one of the following to determine the second power value:
determine whether an uplink physical resource block utilization rate satisfies a threshold;
determine a call connection success rate;
determine a signal to interference and noise ratio; or
determine a success rate for uplink scheduling requests.

17. A device comprising:
one or more processors; and
memory storing instructions that, when executed by the one or more processors, cause the device to:
send, via a first cell, first data associated with first uplink transmissions;
receive, for the first cell, a first indication of a first power value comprising one or more of a Physical Uplink Shared Channel (PUSCH) power value or a Physical Uplink Control Channel (PUCCH) power value, wherein the first power value is based on the first data and second data, and wherein the second data is associated with second uplink transmissions via one or more second cells;
send, via the first cell, a second indication of the first power value;
determine third data associated with third uplink transmissions, wherein the third uplink transmissions are transmitted via the first cell using a transmission power based on the first power value;
receive a first indication of a second power value for the first cell, wherein the second power value is based on the third data and the second data, and wherein the second power value is associated with an adjustment of the first power value; and
send, via the first cell, a second indication of the second power value.

18. The device of claim 17, wherein the first power value is further based on:
an average power value for the first uplink transmissions and the second uplink transmissions;
a comparison of the average power value with an initial power value for the first cell; and
an adjustment, based on the comparison, of the initial power value.

19. The device of claim 17, wherein the second power value is further based on at least one of:
an uplink physical resource block utilization rate;
a call connection success rate;
a signal to interference and noise ratio; or
a success rate for uplink scheduling requests.

20. The device of claim 17, wherein the second power value corresponds to the first power value increased by a predetermined amount, and wherein the second power value is further based on at least one of:
an uplink performance for the first cell satisfying a threshold; or
an uplink performance of the one or more second cells satisfying a threshold.

* * * * *

UNITED STATES PATENT AND TRADEMARK OFFICE
CERTIFICATE OF CORRECTION

PATENT NO. : 10,674,518 B2
APPLICATION NO. : 15/855494
DATED : June 2, 2020
INVENTOR(S) : Rajendran It is certified that error appears in the above-identified patent and that said Letters Patent is hereby corrected as shown below:

In the Specification

Column 10, Detailed Description, Line 8:
Delete "returning" and insert --retuning-- therefor Column 13, Detailed Description, Line 61:
Delete "301-301" and insert --301-303-- therefor Column 15, Detailed Description, Line 5:
Delete "213)." and insert --133).-- therefor Column 18, Detailed Description, Line 47:
Delete "104" and insert --103-- therefor Column 18, Detailed Description, Line 48:
Delete "111" and insert --101-- therefor Column 18, Detailed Description, Line 55:
Delete "104" and insert --103-- therefor Column 29, Detailed Description, Line 58:
Delete "P0_PUSCH" and insert --$P_{0\_PUSCH}$-- therefor Column 40, Detailed Description, Line 16:
Delete "610A" and insert --610-A-- therefor Signed and Sealed this
Third Day of January, 2023

Katherine Kelly Vidal
*Director of the United States Patent and Trademark Office*